United States Patent
Mizutani et al.

(10) Patent No.: US 9,663,137 B2
(45) Date of Patent: May 30, 2017

(54) GUIDE BUSH AND RACK-AND-PINION STEERING GEAR UNIT

(71) Applicant: NSK LTD., Tokyo (JP)

(72) Inventors: Hiroto Mizutani, Maebashi (JP); Keitaro Terao, Maebashi (JP)

(73) Assignee: NSK LTD., Tokyo (JP)

( * ) Notice: Subject to any disclaimer, the term of this patent is extended or adjusted under 35 U.S.C. 154(b) by 7 days.

(21) Appl. No.: 14/779,198

(22) PCT Filed: Jun. 4, 2014

(86) PCT No.: PCT/JP2014/064889
§ 371 (c)(1),
(2) Date: Sep. 22, 2015

(87) PCT Pub. No.: WO2014/196582
PCT Pub. Date: Dec. 11, 2014

(65) Prior Publication Data
US 2016/0059883 A1    Mar. 3, 2016

(30) Foreign Application Priority Data

Jun. 5, 2013  (JP) ................................ 2013-118624
Jul. 5, 2013  (JP) ................................ 2013-141567
Apr. 22, 2014  (JP) ................................ 2014-088500

(51) Int. Cl.
*B62D 3/12* (2006.01)
*F16C 29/02* (2006.01)
(Continued)

(52) U.S. Cl.
CPC ............ *B62D 3/123* (2013.01); *B62D 3/12* (2013.01); *F16C 29/02* (2013.01); *F16C 33/046* (2013.01); *F16C 33/20* (2013.01); *F16C 2326/24* (2013.01)

(58) Field of Classification Search
CPC ........ F16C 33/046; F16C 33/20; F16C 29/02; F16C 2326/24; B62D 3/12; B62D 3/123
See application file for complete search history.

(56) References Cited

U.S. PATENT DOCUMENTS 2,608,451 A * 8/1952 Pierce, Jr. ............. F16C 27/066
384/215
3,820,860 A * 6/1974 Stone .................... F16C 35/02
198/672
(Continued)

FOREIGN PATENT DOCUMENTS

CN          1878964 A     12/2006
CN        101487527 A      7/2009
(Continued)

OTHER PUBLICATIONS

International Search Report for PCT/JP2014/064889 dated Aug. 26, 2014 [PCT/ISA/210].
(Continued)

*Primary Examiner* — Laura Freedman
(74) *Attorney, Agent, or Firm* — Sughrue Mion, PLLC

(57) ABSTRACT

A guide bush includes a plurality of bush elements combined to form a cylindrical shape as a whole. The plurality of bush elements includes a cylindrical fitting portion. The cylindrical fitting portion is fitted in a fit-and-hold portion of a housing, and has an inner peripheral surface configured to guide an outer peripheral surface of a displacement shaft that has been inserted in the cylindrical fitting portion in an axially displaceable manner. The diameter of the circumscribed circle of the plurality of bush elements in a state in which the end faces of the plurality of bush elements with respect to a circumferential direction abut each other is not greater than the inside diameter of the fit-and-hold portion.

14 Claims, 21 Drawing Sheets

(51) Int. Cl.
*F16C 33/04* (2006.01)
*F16C 33/20* (2006.01)

(56) References Cited

U.S. PATENT DOCUMENTS

| | | | | |
|---|---|---|---|---|
| 4,909,638 | A * | 3/1990 | Muto | F16C 43/02 |
| | | | | 384/273 |
| 5,709,283 | A * | 1/1998 | Nief | B62D 5/22 |
| | | | | 180/428 |
| 5,902,049 | A * | 5/1999 | Heshmat | F16C 17/024 |
| | | | | 384/106 |
| 5,937,703 | A | 8/1999 | Engler | |
| 6,176,621 | B1 * | 1/2001 | Naitoh | F16C 9/00 |
| | | | | 384/286 |
| 6,283,902 | B1 * | 9/2001 | Bakoledis | B31B 1/26 |
| | | | | 492/30 |
| 6,793,050 | B2 * | 9/2004 | Nylander | F16F 15/1442 |
| | | | | 188/379 |
| 7,220,056 | B2 * | 5/2007 | Kubota | B62D 1/16 |
| | | | | 384/215 |
| 7,234,870 | B2 * | 6/2007 | Kitahara | F16C 9/02 |
| | | | | 384/288 |
| 7,614,792 | B2 * | 11/2009 | Wade | F16C 17/024 |
| | | | | 384/103 |
| 8,317,401 | B2 * | 11/2012 | Matsuyama | F16C 9/02 |
| | | | | 384/288 |
| 8,408,799 | B2 * | 4/2013 | Ishigo | F16C 9/04 |
| | | | | 384/273 |
| 8,523,444 | B2 * | 9/2013 | Melet | F04D 29/057 |
| | | | | 384/100 |
| 8,690,437 | B2 * | 4/2014 | Ishigo | F16C 9/04 |
| | | | | 384/288 |
| 8,939,646 | B2 * | 1/2015 | Forrest | F16C 17/022 |
| | | | | 384/143 |
| 9,038,238 | B2 * | 5/2015 | Barth | F16C 33/14 |
| | | | | 16/2.1 |
| 9,279,450 | B2 * | 3/2016 | Zaike | F16C 27/063 |
| 2007/0092173 | A1 | 4/2007 | Tsuji et al. | |
| 2008/0088104 | A1 | 4/2008 | Arlt | |
| 2009/0151496 | A1 | 6/2009 | Garabello et al. | |
| 2012/0177311 | A1 * | 7/2012 | Isayama | F16H 57/082 |
| | | | | 384/416 |
| 2013/0004103 | A1 * | 1/2013 | Shaffer | F16C 9/02 |
| | | | | 384/276 |
| 2014/0169913 | A1 * | 6/2014 | Bochert | F16B 43/002 |
| | | | | 411/531 |

FOREIGN PATENT DOCUMENTS

| | | |
|---|---|---|
| EP | 0860345 A2 | 8/1998 |
| JP | 2004-314853 A | 11/2004 |
| JP | 2004-347105 A | 12/2004 |
| JP | 2006-234152 A | 9/2006 |
| JP | 2009024740 A * | 2/2009 |
| JP | 2009-286164 A | 12/2009 |
| JP | 2012-001070 A | 1/2012 |

OTHER PUBLICATIONS

Written Opinion for PCT/JP2014/064889 dated Aug. 26, 2014 [PCT/ISA/237].

Communication dated Dec. 27, 2016, issued by the State Intellectual Property Office of P.R. China in counterpart Chinese application No. 201480017752.7.

* cited by examiner

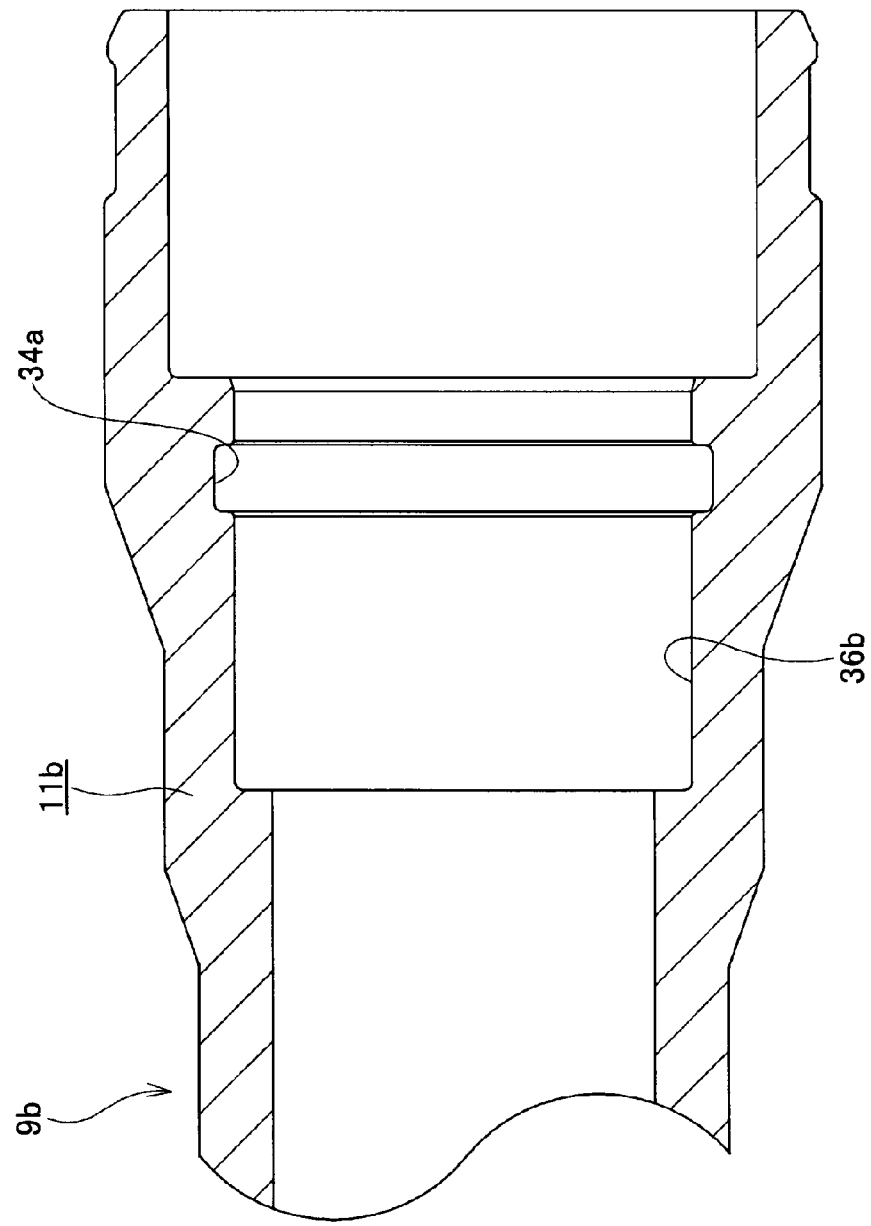

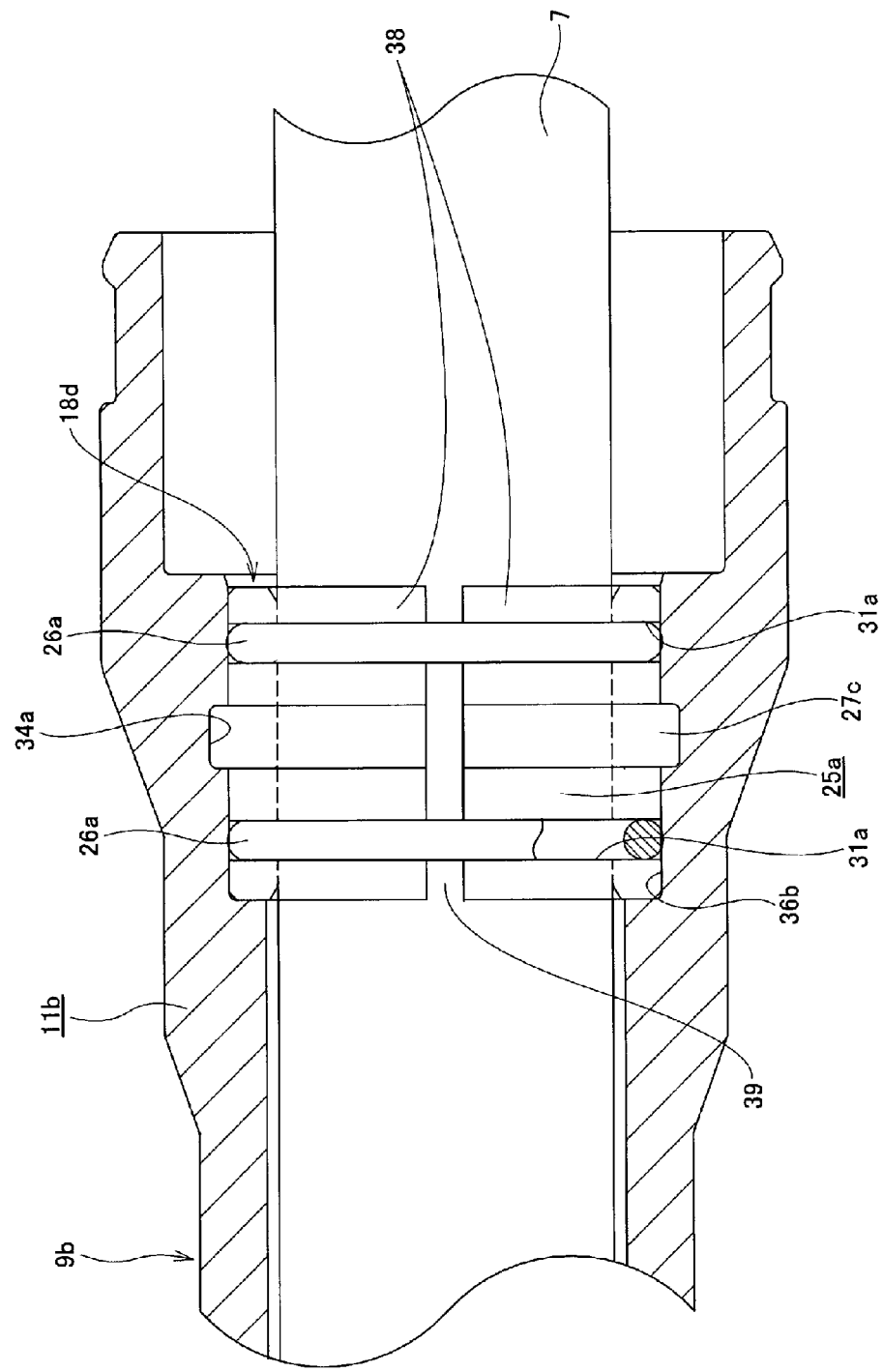

GUIDE BUSH AND RACK-AND-PINION STEERING GEAR UNIT

TECHNICAL FIELD

The present invention relates to a guide bush that supports a shaft so as to be displaceable in an axial direction with respect to a housing, and a rack-and-pinion steering gear unit of a vehicle steering apparatus of using the guide bush.

BACKGROUND ART

Conventionally, a vehicle steering apparatus having a rack-and-pinion steering gear unit has been widely used. FIGS. 16 to 20 illustrate an example of the conventional structure of such a steering apparatus. This steering apparatus has, as the general structure is shown in FIG. 16, a structure where a desired rudder angle can be provided to a non-illustrated right and left steering wheels by such a manner that the rotary movement of a steering wheel 1 operated by the driver is converted to a linear movement by a rack-and-pinion steering gear unit 5. To realize such a structure, specifically, the steering wheel 1 is fixed to the rear end portion of a steering shaft 2. Together with this, the front end portion of this steering shaft 2 is connected to the base end portion of a pinion shaft 6 included in the steering gear unit 5 through a pair of universal joints 3 and 3 and an intermediate shaft 4. Further, to both end portions of a rack shaft 7 included in this steering gear unit 5 and meshed with the pinion shaft 6, the base end portions of a pair of tie rods 8, 8 coupled to the right and left steering wheels, respectively, are connected.

The steering gear unit 5 has, as shown in detail in FIGS. 17 to 20, a housing 9, the pinion shaft 6, the rack shaft 7 and pressing means 10. The housing 9 is fixed to the vehicle body, and integrally includes a first housing portion 11 accommodating the intermediate portion of the rack shaft 7, a second housing portion 12 accommodating the front half portion of the pinion shaft 6 and a third housing portion 13 accommodating the pressing means 10. The pinion shaft 6 has pinion teeth 14 on a part on the side near the front end of the outer peripheral surface. Such a pinion shaft 6 is supported, in a state in which the front half portion is inserted in the second housing portion 12, so as to be only rotatable by a pair of rolling bearings 15 and 16 with respect to this second housing portion 12.

The rack shaft 7 has rack teeth 17 on a portion of a front face thereof near one end in the axial direction. The outer peripheral surface of this rack shaft 7 is a cylindrical surface except for the part where these rack teeth 17 are formed. That is, the cross-sectional shape of the outer peripheral surface of this rack shaft 7 is circular in the part other than the rack teeth 17 with respect to the axial direction, and in the part where these rack teeth 17 are formed with respect to the axial direction, the cross-sectional shape is linear in the part corresponding to these rack teeth 17 and arc-shaped in the remaining part. Such a rack shaft 7 is supported so as to be displaceable in the axial direction through a pair of guide bushes 18, 18 with respect to the first housing portion 11 in a state in which the intermediate part in the axial direction is inserted in the first housing portion 11 and the rack teeth 17 are meshed with the pinion teeth 14.

The guide bushes 18, 18 are formed of a low friction material such as a synthetic resin having oil resistance, a metal having a self-lubricating property or an oil-bearing metal so as to be cylindrical as a whole. The inner peripheral surfaces of the guide bushes 18, 18 have guiding protrusions 20, 20 in a plurality of positions in FIG. 18 in the circumferential direction, and the outer peripheral surfaces of the guide bushes 18, 18 have engagement protrusions 21, 21 in at least one position in FIG. 18 in the circumferential direction. FIG. 18 and FIG. 19 show an example disclosed in Patent Document 1. In this example, the inner peripheral surfaces of the guide bushes 18, 18 have the guiding protrusions 20, 20 in three positions substantially at regular intervals in the circumferential direction, and the outer peripheral surfaces of the guide bushes 18, 18 have the engagement protrusions 21, 21 in two positions at regular intervals in the circumferential direction. By engaging the engagement protrusions 21, 21 with engagement recesses 19, 19 formed on parts near the sides of both ends of the inner peripheral surface of the first housing portion 11, the guide bushes 18, 18 are fixed in a state of being fitted in fit-and-hold portions 36, 36 provided on parts near the sides of both ends of the inner peripheral surface of the first housing portion 11 in a state in which positioning in the circumferential direction is performed. In this state, distal end faces of the guiding protrusions 20, 20 are made to contact a portion of the outer peripheral of the rack shaft 7 other than the rack teeth 17 so as to be slidable in the axial direction.

The pressing means 10 is accommodated inside the third housing portion 13, and includes a pressing member 22 and a spring 23. The pressing surface, i.e., the distal end surface of the pressing member 22 is made to contact a portion of the back face of the rack shaft 7 on the side opposite to the pinion shaft 6 across this rack shaft 7 so that this rack shaft 7 is slidable in the axial direction. In this state, the pressing member 22 is elastically pressed toward the back face of the rack shaft 7 by the spring 23. Thereby, by providing a pre-load to the portion of meshing of the pinion teeth 14 and the rack teeth 17, the occurrence of an unusual noise at this meshing portion is suppressed and the operational feeling of the steering apparatus is improved. The pressing member 22 is made of a low friction material as a whole as mentioned above or has a low friction material layer on the pressing surface that is slidingly in contact with the back face of the rack shaft 7.

A front end portion of the intermediate shaft 4 is connected to a base end portion of the pinion shaft 6 of the steering gear unit 5 configured as described above via the universal joint 3. Together with this, to both end portions in the axial direction of the rack shaft 7, the base end portions of the tie rods 8, 8 are connected through ball joints 24, 24. The ball joints 24, 24 are fixed to both end portions of the rack shaft 7 by screwing or the like, respectively.

When the driver operates the steering wheel 1, this rotation of the steering wheel 1 is transmitted to the pinion shaft 6 through the steering shaft 2, the universal joints 3 and 3 and the intermediate shaft 4. Consequently, the rack shaft 7 is displaced in the axial direction, and together with this, the tie rods 8, 8 are pushed and pulled, whereby a desired rudder angle is provided to the right and left steering wheels.

However, in the case of the steering apparatus of the conventional structure as described above, there is a possibility that the axial displacement of the rack shaft 7 involved in the operation of the steering wheel 1 cannot be performed smoothly. That is, the roundness of the inner peripheral surfaces of the fit-and-hold portions 36, 36 provided on parts near the sides of both ends of the first housing portion 11 of the housing 9 is not always excellent. For this reason, if the guide bushes 18, 18 made of a material softer than the metal material of which the housing 9 is made are fixed in the state of being fitted (pushed) in the fit-and-hold portions 36, 36, there is a possibility that the guide bushes 18, 18 are elastically deformed to decrease the roundness of the inscribed circle of the guiding protrusions 20, 20 provided on the inner peripheral surfaces of the guide bushes 18, 18. Consequently, the contact pressure that acts on the portion where the apical surfaces of the guiding protrusions 20, 20 and the outer peripheral surface of the rack shaft 7 are slidingly in contact with each other becomes nonuniform, so that there is a possibility that the axial displacement of this rack shaft 7 cannot be performed smoothly.

On the contrary, Patent Document 2 and Patent Document 3 disclose guide bush structures capable of smoothly performing the axial displacement of the rack shaft passing inside even when the roundness of the inner peripheral surfaces of the fit-and-hold portions is insufficient. FIG. 21 and FIG. 22 show the structure of a guide bush disclosed in Patent Document 3. A guide bush 18a has a cylindrical fitting portion 25, a pair of elastic rings 26, 26, and a flange portion 27. The cylindrical fitting portion 25 is cylindrical as a whole, and is formed with slits 28, 28 at a plurality of locations along the circumferential direction in the axially inner end portion or the axially intermediate portion and slits 29, 29 in the axially outer end portion or the axially intermediate portion between the slits 28, 28 that are next to each other in the circumferential direction, so that the radial dimension can be expanded or reduced based on the presence of the slits 28, 29. Throughout the present description, the "inside" with respect to the axial direction is the central side in the direction of width of the vehicle body in a state of being incorporated in the vehicle and the left sides of FIGS. 1, 3 to 6, 8, 10, 13, 20 and 21. In contrast, the "outside" with respect to the axial direction is the outer side in the direction of width of the vehicle body in a state of being incorporated in the vehicle and the right sides of FIGS. 1, 3 to 6, 8, 10, 13, 20 and 21. On the cylindrical fitting portion 25, in order to adjust the pressure (secure ventilation) inside a housing 9a (first housing portion 11a), at the inner end portion in the axial direction thereof, a small diameter portion 37 is provided that is smaller in outside diameter than the intermediate portion or the outer end portion in the axial direction, and on the inner peripheral surface thereof, ventilating grooves 30a, 30b whose axial end portions are opened at the end faces of the cylindrical fitting portion 25 and the inner edges of the slits 28, 29, respectively, are provided. The elastic rings 26, 26 are fitted along catching grooves 31, 31 provided on the outer peripheral surface of the cylindrical fitting portion 25. The elastic rings 26, 26 are, like O rings, circular in cross section in free state, and the outside diameter (wire diameter) of the cross-sectional shape is greater than the depth of the catching grooves 31, 31 in free state. The flange portion 27 is provided to protrude outward in the radial direction from the outer peripheral surface of the axially outer end portion of the cylindrical fitting portion 25. In the case of the illustrated example, a catching groove 32 is provided along the entire circumference on the axially outer end surface of the flange portion 27, and an elastic ring 33 like an O ring is locked in the catching groove 32.

When attaching the guide bush 18a described above to a fit-and-hold portion 36a provided on a part near the sides of both ends in the axial direction of the first housing portion 11a of the housing 9a, the widths of the slits 28, 29 are reduced by using a cylindrical jig or the like, the cylindrical fitting portion 25 in a state of being reduced in diameter is inserted in this fit-and-hold portion 36a, the rack shaft 7 is then inserted into this cylindrical fitting portion 25 and this cylindrical fitting portion 25 is elastically increased in diameter. Thereby, the elastic rings 26, 26 are elastically compressed (held) between the bottom surfaces of the catching grooves 31, 31 and the inner peripheral surface of the fit-and-hold portion 36a. Together with this, the flange portion 27 is engaged with an engagement groove 34 formed at the outer end portion (opening side end portion) in the axial direction of this fit-and-hold portion 36a, and the elastic ring 33 is elastically compressed between the bottom surface of the catching groove 32 and the inside surface in the axial direction of an inward flange portion 35 provided at the outer end edge (opening end edge) in the axial direction of the first housing portion 11a. Thereby, the guide bush 18a and thus the rack shaft 7 are prevented from rattling in the first housing portion 11a.

According to the structure of Patent Document 3 as described above, since the inner peripheral surface of the cylindrical fitting portion 25 is elastically pushed against the outer peripheral surface of the rack shaft 7 with an appropriate magnitude of force by the elastic rings 26, 26, even when the roundness of the inner peripheral surface of the fit-and-hold portion 36a is not excellent, the rack shaft 7 can be supported so that it can be smoothly displaced in the axial direction by the guide bush 18a. However, it is necessary to provide the slits 28, 29 and the ventilating grooves 30a, 30b at a plurality of locations along the circumferential direction of the cylindrical fitting portion 25, so that the abrasion resistance of the inner peripheral surface of this cylindrical fitting portion 25 may not be sufficiently ensured due to an increase of manufacturing cost of the guide bush 18a and a reduction of the abutting (sliding contact) area of the inner peripheral surface of the cylindrical fitting portion 25 and the outer peripheral surface of the rack shaft 7. Further, since the overall dimension in the axial direction of the guide bush 18a increases by providing the small diameter portion 37, problems such as cost rise occur. Further, since the guide bush 18a is largely reduced in diameter when attaching the guide bush 18a to the housing 9a, assembling work is deteriorated.

PRIOR ART DOCUMENTS

Patent Documents

Patent Document 1: JP2012-1070A
Patent Document 2: JP2004-347105A
Patent Document 3: JP2006-234152A

SUMMARY OF INVENTION

Problem to be Solved by Invention

In view of the circumstances described above, it is an object of the present invention to provide a structure capable of supporting a displacement shaft such as a rack shaft in a fit-and-hold portion without play and sufficiently ensuring abrasion resistance.

Means for Solving the Problem

According to an aspect of the present invention, a guide bush includes a plurality of bush elements combined to form a cylindrical shape as a whole. The plurality of bush elements includes a cylindrical fitting portion. The cylindrical fitting portion is configured to be fitted in a fit-and-hold portion of a housing, and has an inner peripheral surface configured to guide an outer peripheral surface of a displacement shaft (for example, a rack shaft of a rack-andpinion steering gear unit) that has been inserted in the cylindrical fitting portion in an axially displaceable manner. The diameter of the circumscribed circle of the plurality of bush elements in a state in which end faces of the plurality of bush elements with respect to a circumferential direction abut each other is not greater than the inside diameter of the fit-and-hold portion. A gap is provided between the end faces of the plurality of bush elements with respect to the circumferential direction in a state in which the cylindrical fitting portion is fitted in the fit-and-hold portion and the displacement shaft is inserted in the cylindrical fitting portion.

The plurality of bush elements may further include a flange portion. The flange portion is provided to protrude outward in the radial direction from an axially partial outer peripheral surface of the cylindrical fitting portion and configured to engage with an engagement groove formed on the inner peripheral surface of the fit-and-hold portion. The diameter of the circumscribed circle of the flange portion in a state in which the end faces of the plurality of bush elements with respect to the circumferential direction abut each other is not greater than the inside diameter of the fit-and-hold portion.

The width L of the gap with respect to the circumferential direction may be equal to or greater than $(D-d)\sin(\pi/n)$, that is, may be $L \leq (D-d)\sin(\pi/n)$, where n is the number of the plurality of bush elements, D is the diameter of the circumscribed circle of the flange portion in a state in which the displacement shaft is inserted in the cylindrical fitting portion, and d is the inside diameter of the fit-and-hold portion.

The guide bush may further include a joint portion configured to couple the plurality of bush elements to each other in a state before the displacement shaft is inserted into the cylindrical fitting portion and to break or to elongate in the circumferential direction in accordance with the insertion of the displacement shaft into the cylindrical fitting portion. The joint portion is provided to bridge between the end faces of the plurality of bush elements with respect to the circumferential direction, and couples, at least axially partially, the end faces with respect to the circumferential direction to each other.

According to another aspect of the present invention, a guide bush includes a cylindrical fitting portion and a joint portion. The cylindrical fitting portion is configured to be fitted in a fit-and-hold portion of a housing, and has an inner peripheral surface configured to guide an outer peripheral surface of a displacement shaft (for example, a rack shaft of in a rack-and-pinion steering gear unit) that has been inserted in the cylindrical fitting portion in an axially displaceable manner and a discontinuous portion at at least one location in the circumferential direction. The joint portion is provided to bridge between end faces of the cylindrical fitting portion with respect to a circumferential direction interposing the discontinuous portion and to couple, at least axially partially, the end faces with respect to the circumferential direction to each other. The joint portion is configured to break or to elongate in the circumferential direction in accordance with the insertion of the displacement shaft into the cylindrical fitting portion. The width of the discontinuous portion with respect to the circumferential direction is increased by the insertion of the displacement shaft into the cylindrical fitting portion.

The guide bush may further include a flange portion. The flange portion is provided to protrude radially outward from an axially partial outer peripheral surface of the cylindrical fitting portion and configured to engage with an engagement groove formed on the inner peripheral surface of the fit-and-hold portion.

The diameter of the circumscribed circle of the flange portion may be not greater than the inside diameter of the fit-and-hold portion in the state before the displacement shaft is inserted into the cylindrical fitting portion.

The discontinuous portion may be provided at a plurality of locations in the circumferential direction. The guide bush may be formed by coupling a plurality of partially cylindrical bush elements together by the joint portion in the state before the displacement shaft is inserted into the cylindrical fitting portion.

The joint portion may be provided to bridge between the end faces of the plurality of bush elements with respect to the circumferential direction at one axial end portion of the cylindrical fitting portion, the flange portion may be provided at the other end portion in the axial direction of the cylindrical fitting portion, and the end faces of the plurality of bush elements with respect to the circumferential direction may have a pair of slanted face portions opposed to each other in the circumferential direction at the other axial end portion of the cylindrical fitting portion and slanting in directions separating from each other toward an axially outer side of the cylindrical fitting portion. The diameter of the circumscribed circle of the flange portion is not greater than the inside diameter of the fit-and-hold portion in the state before the displacement shaft is inserted into the cylindrical fitting portion and in a state in which the pair of slanted face portions are caused to abut each other or closely opposed to each other. Alternatively, the discontinuous portion may be provided only at one location in the circumferential direction.

The guide bush may be integrally formed by injection molding of a synthetic resin.

The guide bush may further include an elastic ring, the outer peripheral surface of the cylindrical fitting portion may have a catching groove, and the elastic ring may be fitted along the catching groove.

The cross-sectional shape of the elastic ring in free state may be circular, and the outside diameter of the cross-sectional shape of the elastic ring may be greater than the depth of the catching groove in free state.

According to another aspect of the present invention, a rack-and-pinion steering gear unit includes a housing, the guide bush described above, a rack shaft, a pinion shaft and pressing means. The housing has a fit-and-hold portion and configured to be fixed to a vehicle body. The guide bush is fixed to the fit-and-hold portion. The rack shaft has a front face on which rack teeth are formed axially partially, and is supported inside the housing in a state of being inserted in the guide bush. The pinion shaft has an outer peripheral surface on which pinion teeth are formed axially partially, and is rotatably supported inside the housing in a state in which the pinion teeth are meshed with the rack teeth. The pressing means has a pressing member and is provided inside the housing in a state in which the pressing member elastically presses a portion of the back face of the rack shaft opposite to the pinion shaft across the rack shaft. With respect to the axial direction of the rack shaft, the fit-and-hold portion is provided at at least one end portion of the housing, the one end portion being farther from the pinion shaft than another end portion of the housing. The outer peripheral surface of the rack shaft is supported inside the housing in a state of being guided by the inner peripheral surface of the guide bush in the axially displaceable manner.

Advantages of the Invention

According to the guide bush and rack-and-pinion steering gear unit of the present invention configured as described above, it is possible to provide, at low cost, a structure capable of supporting a displacement shaft such as a rack shaft in a fit-and-hold portion without play and sufficiently ensuring abrasion resistance. When attaching the guide bush of the present invention to the fit-and-hold portion, the guide bush is inserted into the fit-and-hold portion in a state in which the end faces of the bush elements with respect to the circumferential direction abut each other so that the outside diameter of the guide bush is reduced. The outside diameter of the guide bush is increased in accordance with the insertion of the displacement shaft, such as a rack shaft, into the cylindrical fitting portion, and the outer peripheral surface of the cylindrical fitting portion is caused to abut or be closely opposed to the inner peripheral surface of the fit-and-hold portion and the flange portion provided axially partially on the outer peripheral surface is engaged with the engagement groove. As a result, the displacement shaft can be supported in the fit-and-hold portion without play through the guide bush, and the axial displacement of this displacement shaft can be performed smoothly. According to the present invention, in a state of being attached to the fit-and-hold portion, the gap is interposed between the end faces of the plurality of bush elements with respect to the circumferential direction, and the pressure inside the housing is adjusted based on this gap (ventilation is ensured). Therefore, it is unnecessary to provide, on the cylindrical fitting portion, the small diameter portion and the ventilating grooves for securing ventilation, in order to adjust the pressure inside this housing like the structure described in the above-described Patent Document 2. For this reason, even if the length in the axial direction of the guide bush is reduced, the area of sliding contact between the inner peripheral surface of the cylindrical fitting portion and the outer peripheral surface of the displacement shaft is never excessively small. As a result, the size can be reduced while the abrasion resistance of the guide bush is sufficiently ensured. In the case of the present invention, by combining a plurality of bush elements for this guide bush, it is made possible to increase and reduce the outside diameter and adjust the pressure inside the housing. Therefore, it is unnecessary to provide the slits and the ventilating grooves at a plurality of locations in the circumferential direction like the structure of Patent Document 3, so that the manufacturing cost can be prevented from increasing unnecessarily.

According to the guide bush and rack-and-pinion steering gear unit of the present invention configured as described above, the attachment of the guide bush to the fit-and-hold portion of the housing can be performed easily. That is, according to the guide bush of the present invention, before inserting the displacement shaft into the cylindrical fitting portion, the joint portion provided to bridge between the end faces with respect to the circumferential direction at locations interposing the discontinuous portion can prevent the end faces with respect to the circumferential direction coupled by the joint portion from displacing relative to each other in the axial direction and the circumferential direction of the cylindrical fitting portion. Therefore, the guide bush can be prevented from separating into a plurality of elements (bush elements), so that the configuration of this guide bush can be maintained substantially cylindrical. When attaching the guide bush of the present invention to the fit-and-hold portion, the guide bush is inserted into this fit-and-hold portion as it is (includes a state in which the diameter is slightly reduced by the elastic rings), and thereafter, the displacement shaft is inserted into the cylindrical fitting portion. Thereby, the joint portion is broken or elongated to increase the outside diameter of this guide bush (increase the widths of all the discontinuous portions) and in some cases, separate the guide bush into a plurality of elements. The outer peripheral surface of the cylindrical fitting portion is caused to abut or be closely opposed to the inner peripheral surface of the fit-and-hold portion, and the flange portion provided on a part in the axial direction of the outer peripheral surface of this cylindrical fitting portion is engaged with the engagement groove. As a result, the guide bush and thus the displacement shaft can be supported in the fit-and-hold portion without play. As described above, according to the present invention, a jig for pushing the guide bush into this fit-and-hold portion with a great deal of force and inserting this guide bush into the fit-and-hold portion while reducing the diameter is unnecessary, so that the assembling work can be facilitated. Further, since the configuration of the guide bush of the present invention can be maintained substantially cylindrical (not separated into a plurality of elements) before inserting the rack shaft, assembling work as well as handling work are improved.

BRIEF DESCRIPTION OF THE DRAWINGS

FIG. 3 is an enlarged cross-sectional view of a housing.

FIG. 6 is an enlarged cross-sectional view of a structure according to a second modification of the first embodiment.

EMBODIMENTS OF INVENTION

Figure 1:
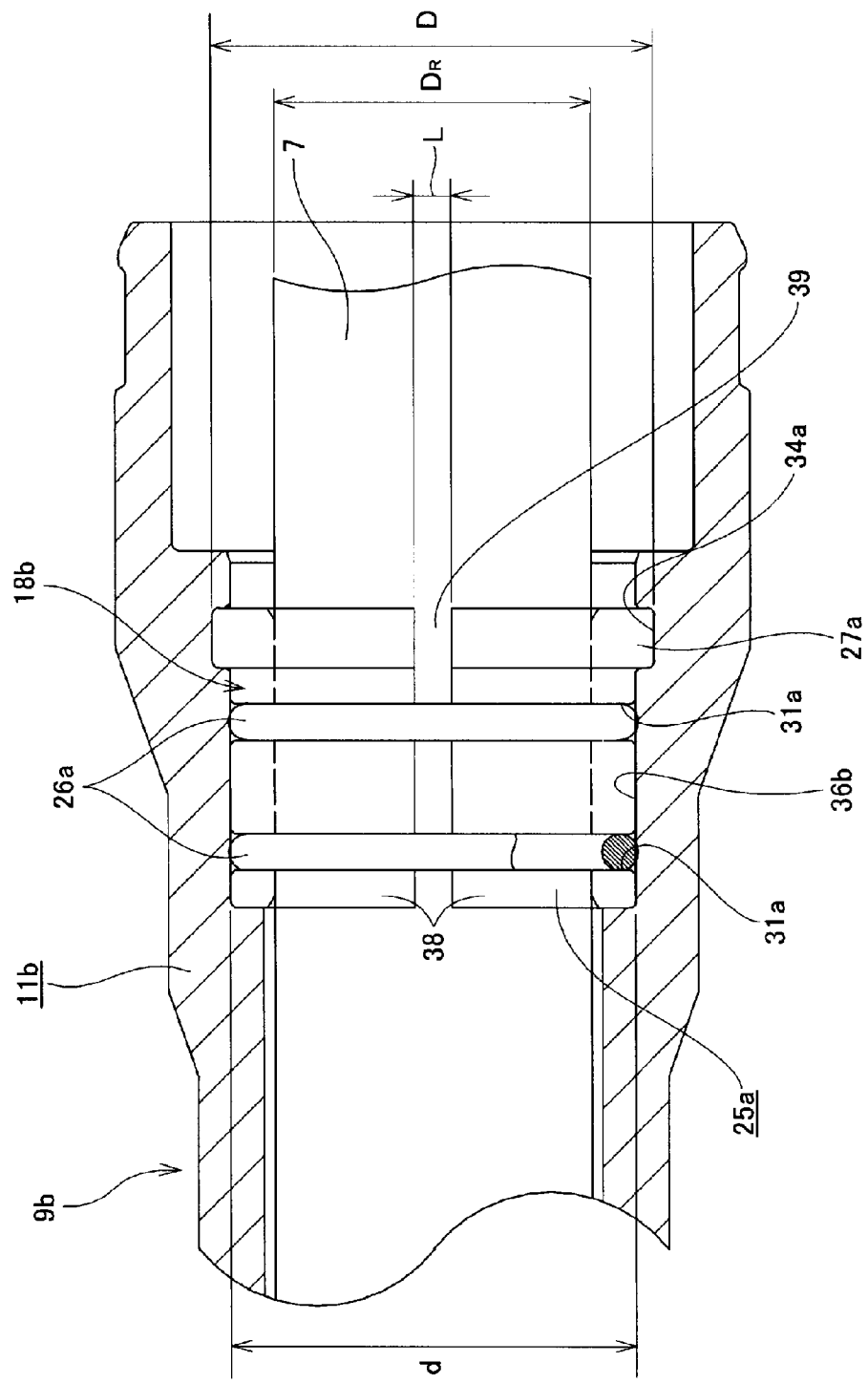
FIG. 1 is an enlarged cross-sectional view of a structure according to a first embodiment of the present invention.
Figure 2A:
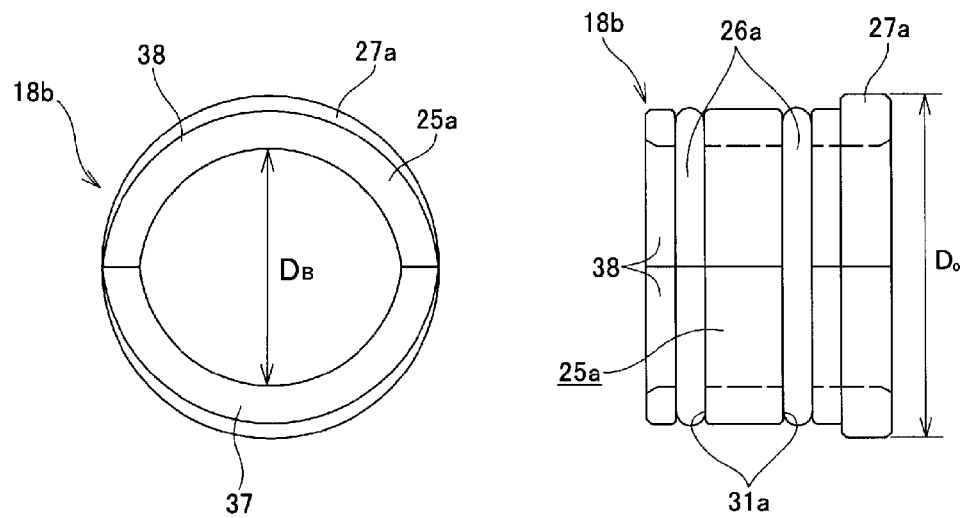
FIG. 2A includes an end view of a guide bush according to the first embodiment and a side view of the guide bush viewed from the right side of the end view, illustrating a state before inserting a rack shaft into the guide bush.
Figure 2B:
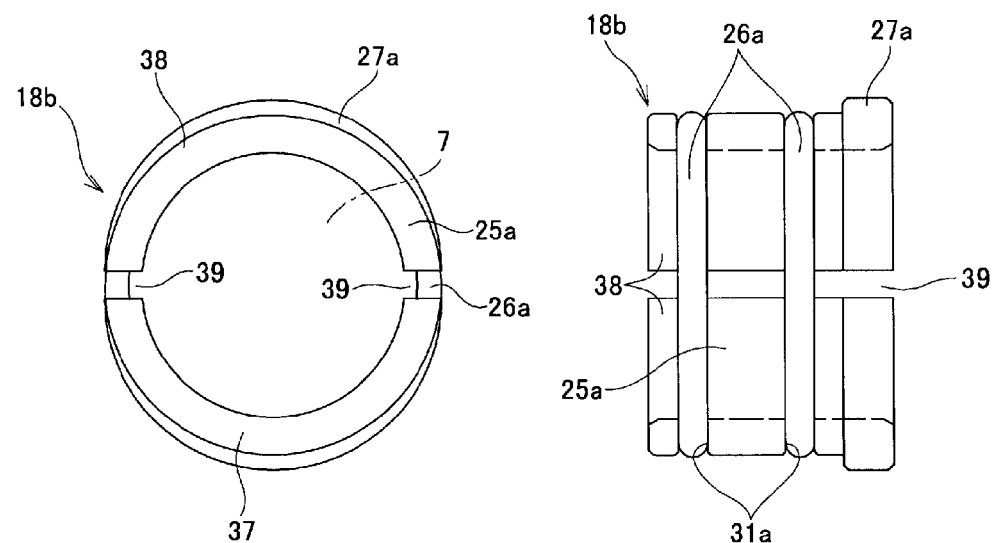
FIG. 2B includes an end view of the guide bush and a side view of the guide bush viewed from the right side of the end view, and showing a state after inserting the rack shaft into the guide bush.
Figure 4:
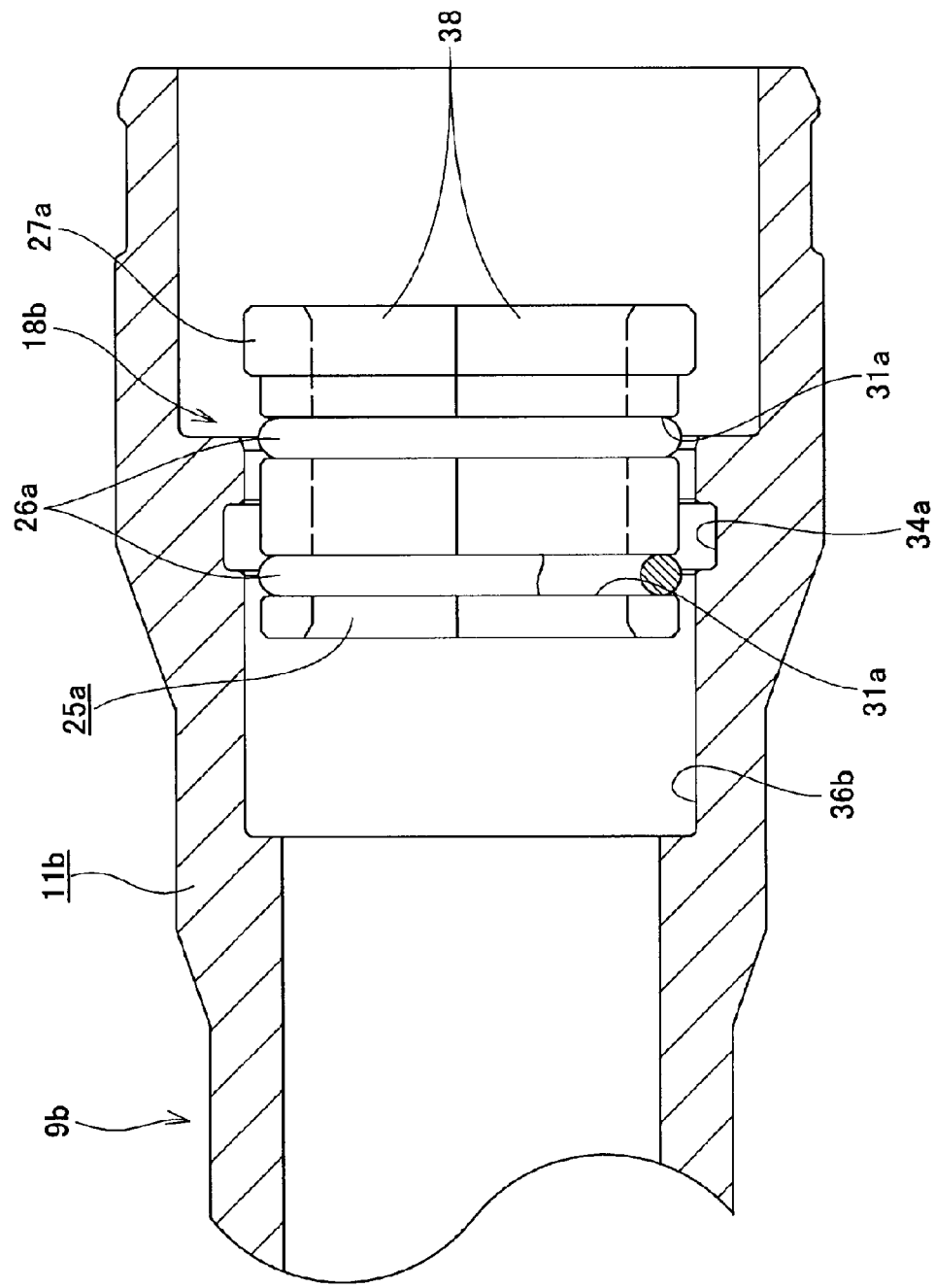
FIG. 4 is a view illustrating how the guide bush is attached to the housing.

FIGS. 1 to 4 show a first embodiment of the present invention. The present example is characterized in that a structure capable of supporting the rack shaft 7 in a fit-and-hold portion 36b without play and for sufficiently ensuring abrasion resistance is realized while the rise of manufacturing cost is curbed. Since the configurations and operations of other portions are similar to those of the above-described conventional structure shown in FIGS. 16 to 19, overlapping illustrations and descriptions will be omitted.

A guide bush 18b of the present example is configured so as to be cylindrical as a whole and that the outside diameter can be increased and decreased by combining a pair of bush elements 38, 38 that are each semicylindrical. The guide bush 18b includes a cylindrical fitting portion 25a, a pair of elastic rings 26a, 26a and a flange portion 27a. The cylindrical fitting portion 25a has the rack shaft 7 inserted therein, and guides the outer peripheral surface of this rack shaft 7 by the inner peripheral surface so as to be displaceable in the axial direction. On the outer peripheral surface of the cylindrical fitting portion 25a, a pair of catching grooves 31a, 31a are provided. The elastic rings 26a, 26a are fitted along the catching grooves 31a, 31a. The elastic rings 26a, 26a are for preventing the bush elements 38, 38 from separating from each other before attaching the guide bush 18b to the fit-and-hold portion 36b provided at the axial end portion of a first housing portion 11b forming a housing 9b. The flange portion 27a is provided to protrude radially outward from the outer peripheral surface of the axially outer end portion of the cylindrical fitting portion 25a.

When attaching the guide bush 18b described above to the fit-and-hold portion 36b, the guide bush 18b is inserted into the fit-and-hold portion 36b in a state in which the end faces of the bush elements 38, 38 with respect to the circumferential direction abut each other so that the outside diameter of the guide bush 18b is reduced, and the axially inner end face of the cylindrical fitting portion 25a is caused to butt against the inner end face (stepped face) of the fit-and-hold portion 36b. By inserting the rack shaft 7 into the cylindrical fitting portion 25a and providing gaps 39, 39 between the end faces of the bush elements 38, 38 with respect to the circumferential direction, the outside diameter of the guide bush 18b is increased. In this state, the outer peripheral surface of the cylindrical fitting portion 25a abuts or is closely opposed to the inner peripheral surface of the fit-and-hold portion 36b. That is, as in the case of the above-described guide bush of Patent Document 3, if members that are circular in cross section in free state like O rings and the outside diameter (wire diameter) of the cross-sectional shape of which is greater than the depth of the catching grooves 31a, 31a in free state are used as the elastic rings 26a, 26a, the outer peripheral surface of the cylindrical fitting portion 25a and the inner peripheral surface of the fit-and-hold portion 36b are closely opposed to each other through an annular gap. In this state, the elastic rings 26a, 26a are elastically compressed (held) between the bottom surfaces of the catching grooves 31a, 31a and the inner peripheral surface of the fit-and-hold portions 36b. On the contrary, when members the thickness of the cross-sectional shape with respect to the radial direction of the rack shaft 7 of which is not more than the depth of the catching grooves 31a, 31a in free state are used as the elastic rings 26a, 26a, the outer peripheral surface of the cylindrical fitting portion 25a and the inner peripheral surface of the fit-and-hold portion 36b abut each other. In this case, not only members that are circular in cross section in free state as shown in the figure but also members that are, for example, rectangular or oval may be used as the elastic rings 26a, 26a. In any case, in a state in which the outside diameter of the guide bush 18b is increased, the flange portion 27a is engaged with an engagement groove 34a provided along the entire circumference 36b on a part near the side of the outer end in the axial direction of the fit-and-hold portion (the outer peripheral surface of the flange portion 27a and the bottom surface of the engagement groove 34a abut each other or are closely opposed to each other). To realize such a structure, in the case of the present example, the configuration of each part of the guide bush 18b is restricted as follows:

That is, in order to hold the guide bush 18b without play, in a state in which the rack shaft 7 is inserted in the cylindrical fitting portion 25a, the outside diameter of this cylindrical fitting portion 25a is made substantially the same as the inside diameter of the fit-and-hold portion 36b and the outside diameter of the flange portion 27a is made substantially the same as the inside diameter of the bottom surface of the engagement groove 34a. In order that the guide bush 18b can be inserted in the fit-and-hold portion 36b, restriction is made so that the outside diameter (the diameter of the circumscribed circle) D0 of the flange portion 27a is not greater than the inside diameter d of the fit-and-hold portion 36b (D0<d) in a state in which the end faces of the bush elements 38, 38 with respect to the circumferential direction abut each other (the gaps 39, 39 are made 0). Specifically, the configuration of the guide bush 18b is restricted so that the width L with respect to the circumferential direction of the gap 39 is equal to or greater than $(D-d)\sin(\pi/n)$ where the number of bush elements 38, 38 is n (two in the case of the present example) and the outside diameter of the flange portion 27a in a state in which the rack shaft 7 is inserted on the inside diameter side of the cylindrical fitting portion 25a is D. In a state in which the end faces of the bush elements 38, 38 with respect to the circumferential direction abut each other, the minimum inside diameter $D_B$ of the guide bush 18b is smaller than the outside diameter $D_R$ of the rack shaft 7.

According to the guide bush 18b of the present example as described above, a structure can be inexpensively realized where the rack shaft 7 can be supported in the fit-and-hold portion 36b without play and abrasion resistance can be sufficiently ensured. That is, according to the present example, the outer peripheral surface of the cylindrical fitting portion 25a and the inner peripheral surface of the fit-and-hold portion 36b abut each other or are closely opposed to each other in a state in which the rack shaft 7 is inserted in the guide bush 18b and attached to the fit-and-hold portion 36b. Consequently, the rack shaft 7 can be supported in the fit-and-hold portion 36b via the guide bush 18b without play, and the axial displacement of the rack shaft 7 can be smoothly performed in accordance with the operation of the steering wheel 1 (see FIG. 16). In particular, when the outside diameter of the pair of elastic rings 26a, 26a in free state is greater than the depth of the catching grooves 31a, 31a provided on the outer peripheral surface of the cylindrical fitting portion 25a, the pair of elastic rings 26a, 26a are elastically held between the bottom surfaces of the catching grooves 31a, 31a and the inner peripheral surface of the fit-and-hold portion 36b. For this reason, even when the roundness of the inner peripheral surface of this fit-and-hold portion 36b is not excellent, the axial displacement of the rack shaft 7 can be performed smoothly. This reason is similar to the case of the above-described structure of Patent Document 3. On the other hand, when the outside diameter of the elastic rings 26a, 26a in free state is not more than the depth of the catching grooves 31a, 31a, the outer peripheral surface of the cylindrical fitting portion 25a and the inner peripheral surface of the fit-and-hold portion 36b can be caused to abut each other in a wide range except the part where the catching grooves 31a, 31a are provided and the part where the gaps 39, 39 are provided. As a result, the area of the part bearing the radial load applied from the rack shaft 7 can be increased.

In a state in which the guide bush 18b is attached to the fit-and-hold portion 36b, the gaps 39, 39 are interposed between the end faces of the bush elements 38, 38 with respect to the circumferential direction. According to the present example, the pressure inside the housing 9b can be adjusted based on the gaps 39, 39. Therefore, it is unnecessary to provide a small diameter portion or ventilating grooves that are open at slits on the cylindrical fitting portion 25a like the structure of Patent Document 3. For this reason, unnecessary increase in the length in the axial direction of the guide bush 18b and excessive decrease in the area of sliding contact between the inner peripheral surface of the cylindrical fitting portion 25a and the outer peripheral surface of the rack shaft 7 can be prevented. In the case of the present example, the entire inner peripheral surfaces of the bush elements 38, 38 of the guide bush 18b can be caused to abut the outer peripheral surface of the rack shaft 7. As a result, the guide bush 18b can be reduced in size while the abrasion resistance of this guide bush 18b is sufficiently ensured. In the case of the present example, by combining the bush elements 38, 38, it is made possible to increase and reduce the outside diameter of the guide bush 18b so that the guide bush 18b is insertable in the fit-and-hold portion 36b, and the gaps 39, 39 for adjusting the pressure inside the housing 9b are provided. Therefore, since it is unnecessary to provide slits and ventilating grooves at a plurality of locations in the circumferential direction as in the structure of Patent Document 3, the manufacturing cost can be prevented from increasing unnecessarily.

Figure 5:
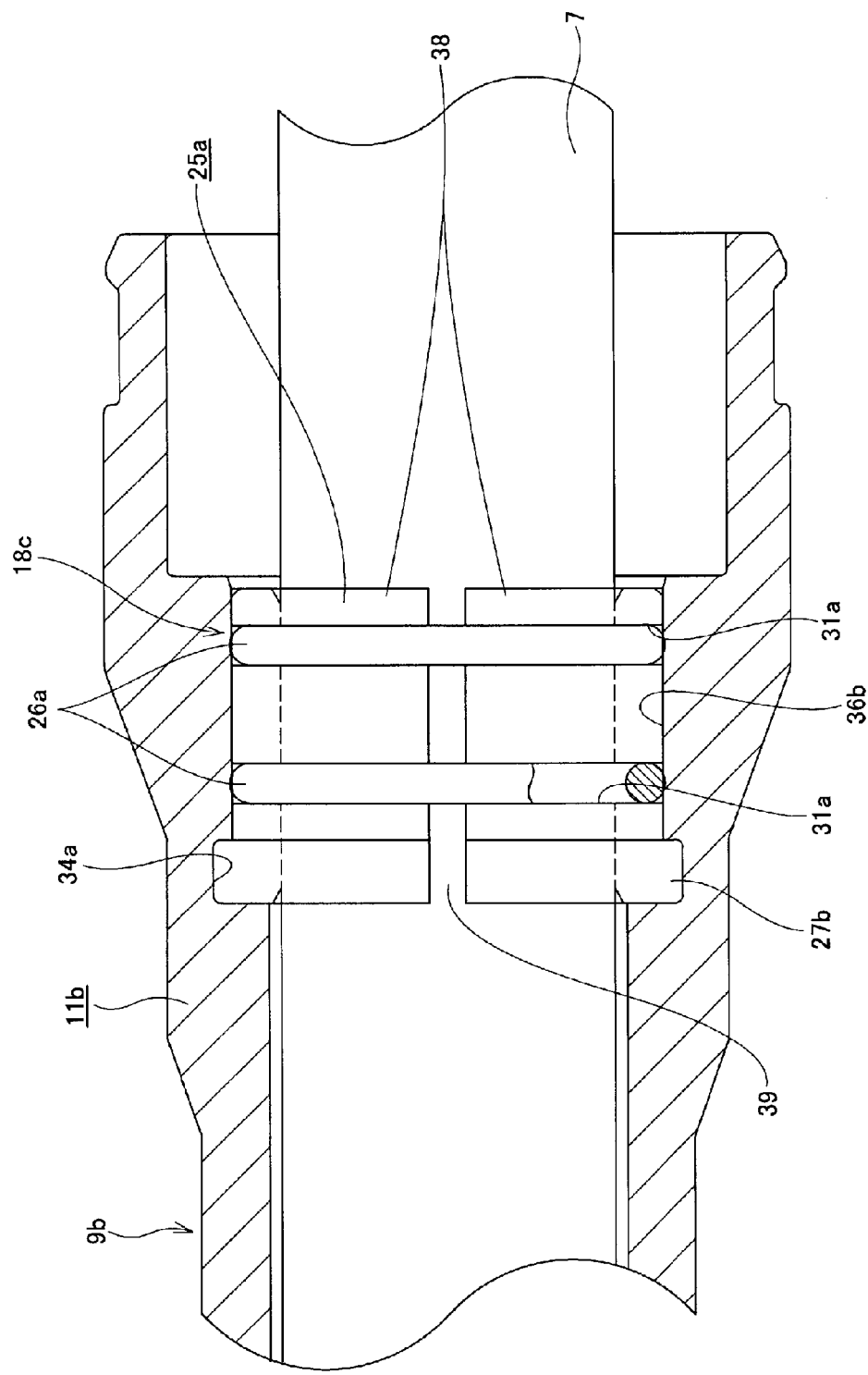
FIG. 5 is an enlarged cross-sectional view of a structure according to a first modification of the first embodiment.

FIG. 5 and FIG. 6 show a first modification and a second modification of the first embodiment. In the case of the example of FIG. 5, a flange portion 27b of a guide bush 18c is provided on the outer peripheral surface of the inner end portion of the axial direction of the cylindrical fitting portion 25a. In the case of the example of FIG. 6, a flange portion 27c of a guide bush 18d is provided on the outer peripheral surface of the intermediate portion in the axial direction of the cylindrical fitting portion 25a. Since the configurations and operations of other portions are similar to those of the above-described first embodiment, the illustrations and descriptions related to the overlapping portions will be omitted.

Figure 7A:
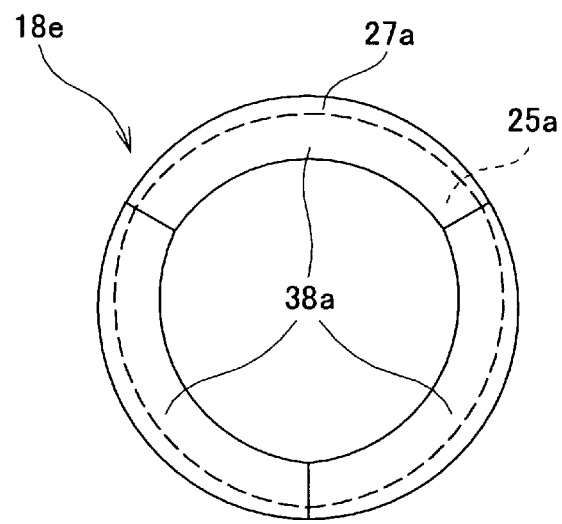
FIG. 7A is an end view of a guide bush according to a third modification of the first embodiment, and showing a state before inserting a rack shaft into the guide bush.
Figure 7B:
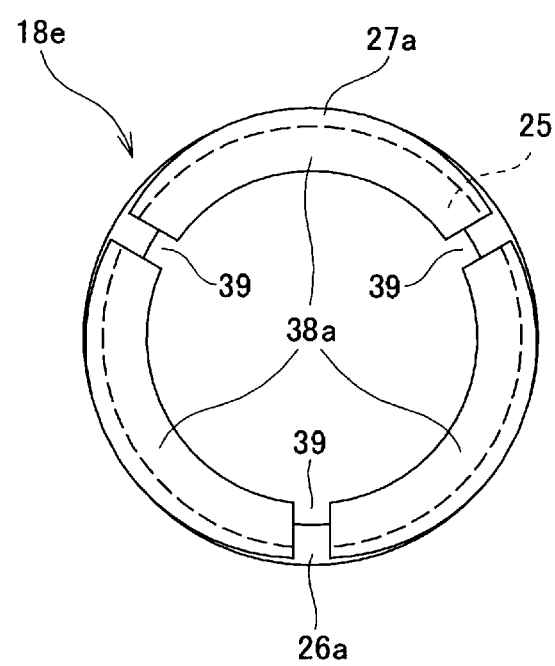
FIG. 7B is an end view of the guide bush of FIG. 7A, and showing a state after inserting the rack shaft into the guide bush.

FIG. 7A and FIG. 7B show a third modification of the first embodiment. In the case of the present example, a guide bush 18e is configured so as to be cylindrical as a whole and that the outside diameter can be increased and decreased by combining three bush elements 38a and 38a that are each partially cylindrical. Since the configurations and operations of other portions are similar to those of the above-described first embodiment, the illustrations and descriptions related to the overlapping portions will be omitted.

Figure 8:
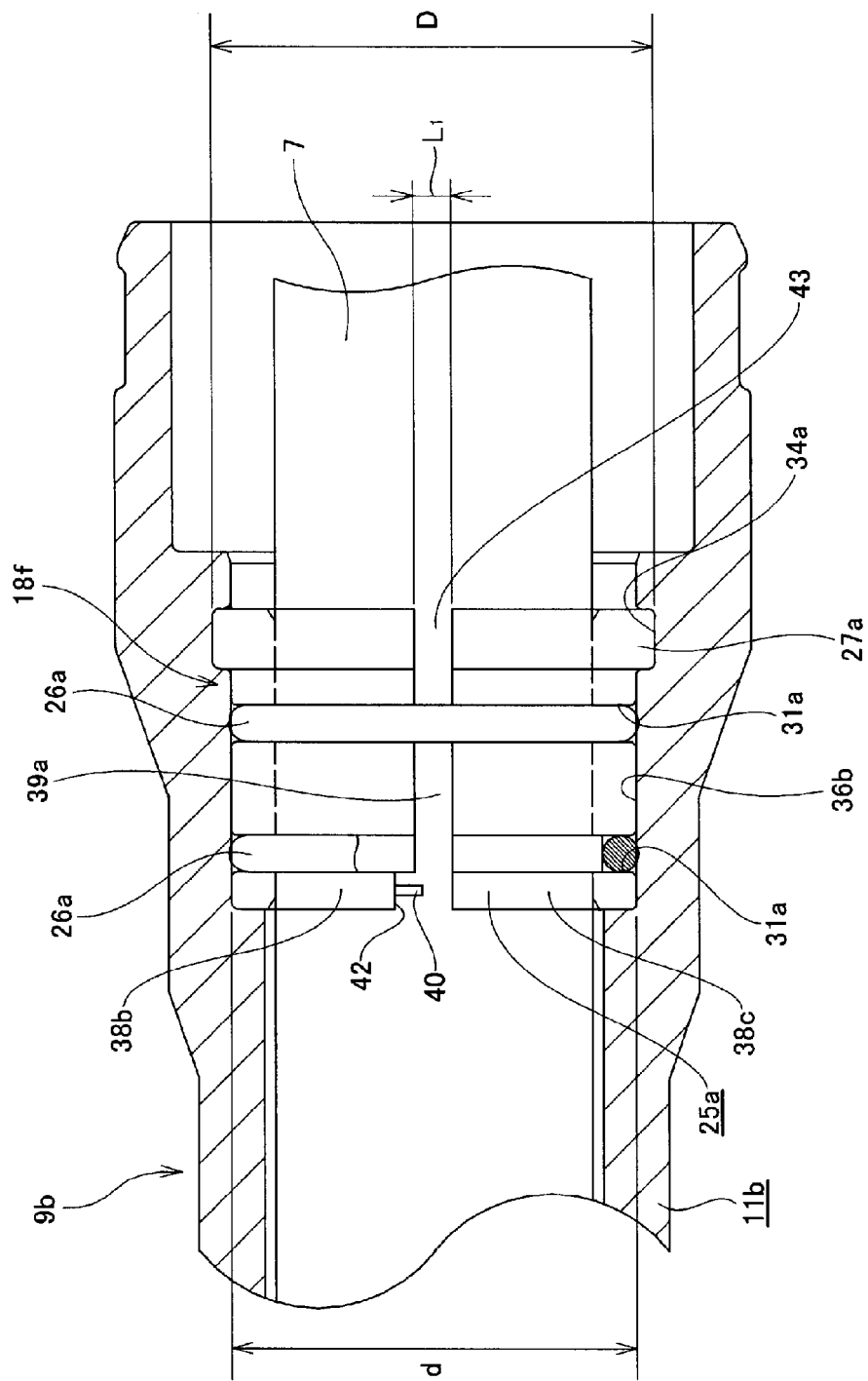
FIG. 8 is an enlarged cross-sectional view of a structure according to a second embodiment of the present invention.
Figure 9A:
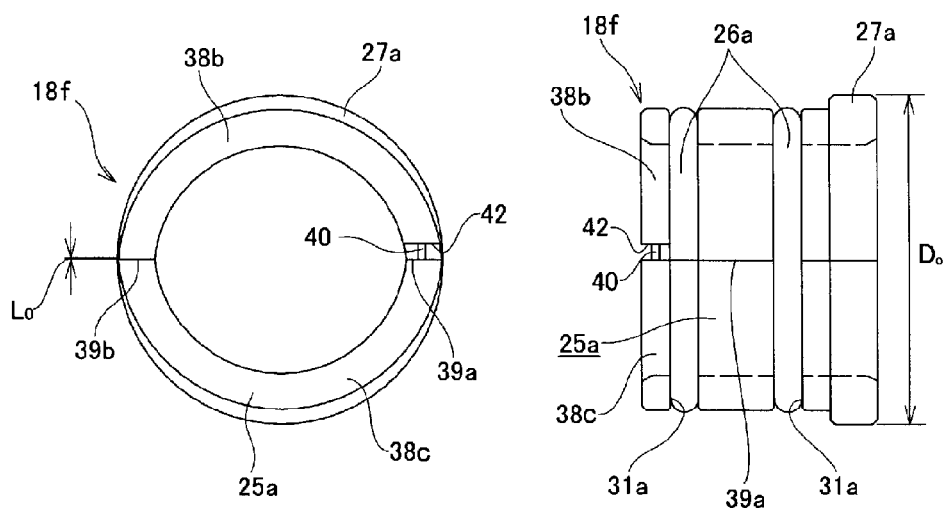
FIG. 9A includes an end view of a guide bush according to the second embodiment and a side view of the guide bush viewed from the right side of the end view, illustrating a state before inserting a rack shaft into the guide bush.
Figure 9B:
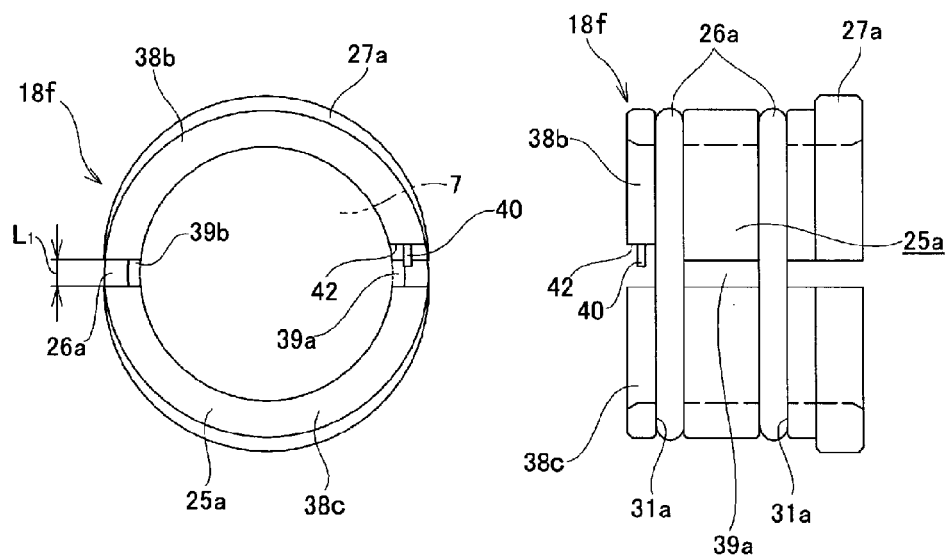
FIG. 9B includes an end view of the guide bush according to the second embodiment and a side view of the guide bush viewed from the right side of the end view, illustrating a state after inserting the rack shaft into the guide bush.
Figure 10:
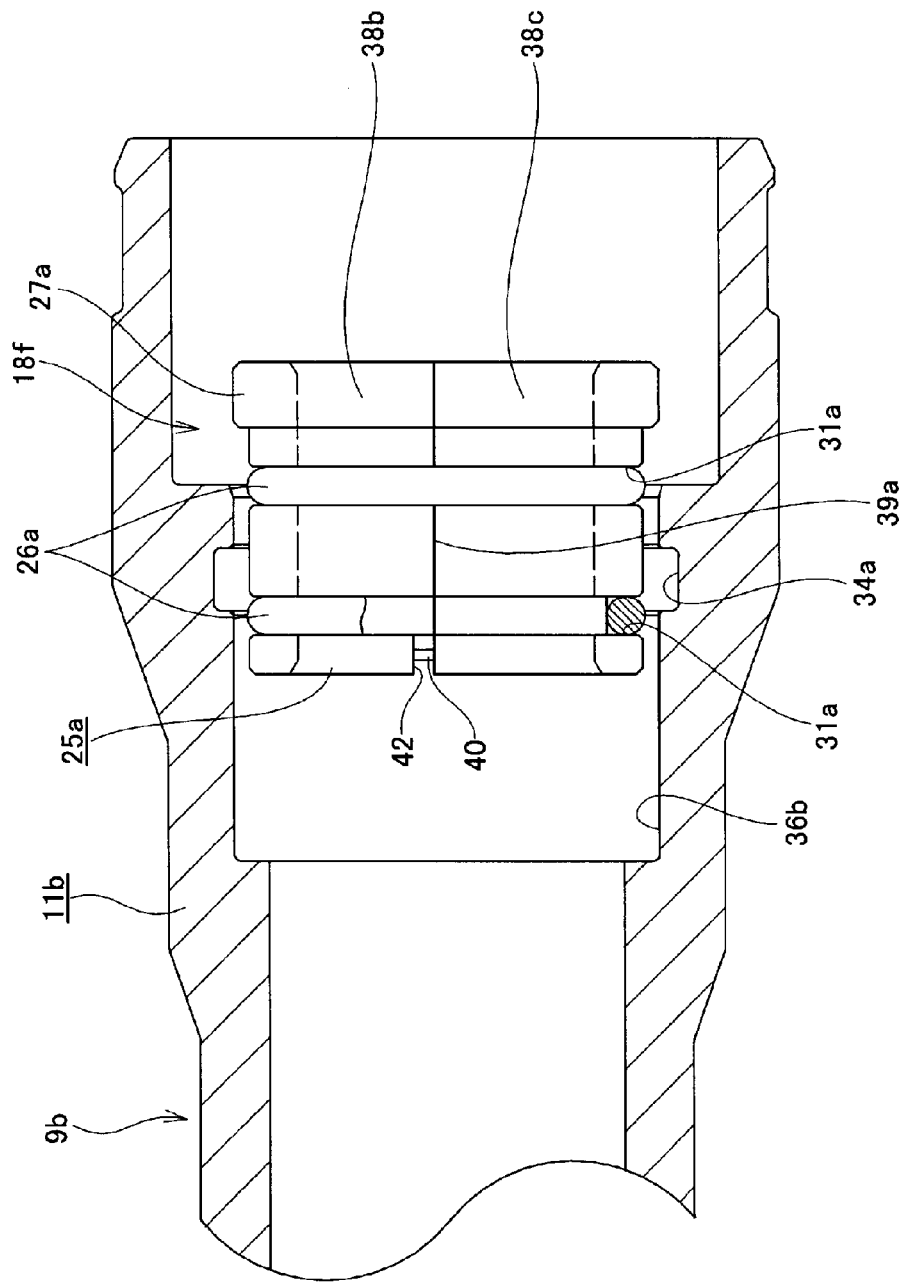
FIG. 10 is a view illustrating how the guide bush of FIG. 8 is attached to the housing.

FIGS. 8 to 10 illustrate a second embodiment of the present invention. The present example is characterized in that a structure of a guide bush 18f that enables easy attachment to the fit-and-hold portion 36b is provided. Since the configurations and operations of other portions are similar to those of the foregoing conventional structure shown in FIGS. 16 to 19, overlapping illustrations and descriptions will be omitted.

The guide bush 18f of the present example is configured so as to be substantially cylindrical as a whole by combining a pair of bush elements 38b, 38c that are each made of a synthetic resin and substantially semicylindrical, and has discontinuous portions (gaps) 39a, 39b at two locations in the circumferential direction (locations opposite to each other in the diametrical direction). That is, according to the present example, the portions between the end faces of the bush elements 38b, 38c with respect to the circumferential direction are the discontinuous portions 39a, 39b. The guide bush 18f includes the cylindrical fitting portion 25a, the pair of elastic rings 26a, 26a, the flange portion 27a and a joint portion 40. The cylindrical fitting portion 25a has the rack shaft 7 inserted therein, and guides the outer peripheral surface of this rack shaft 7 by the inner peripheral surface so as to be displaceable in the axial direction. On the outer peripheral surface of the cylindrical fitting portion 25a, the pair of catching grooves 31a, 31a are provided. The elastic rings 26a, 26a are annular as a whole, circular in cross section in free state like O rings, and fitted along the catching grooves 31a, 31a, respectively. The flange portion 27a is provided to protrude outward in the radial direction from the outer peripheral surface of the outer end portion (the right end portion of FIG. 8) in the axial direction of the cylindrical fitting portion 25a (the protrusion amount is largest in the central parts of the bush elements 38b, 38c). The joint portion 40 has a strength that can keep the configuration of the guide bush 18f substantially cylindrical before attaching the guide bush 18f to the housing 9b, has a thin cylindrical form, and is provided to bridge, at the axially inner end portion of the fit-and-hold portion 25a (the left end portion in FIG. 8), between the end faces of the bush elements 38b, 38c with respect to the circumferential direction at locations interposing one 39a of the discontinuous portions 39a, 39b. Specifically, a notch portion 42 is formed in the end portion in the circumferential direction of one bush element 38b, and the joint portion 40 is disposed in the portion. In the case of the present example, no joint portion is provided on the other discontinuous portion 39b (this is a mere gap). With such a structure, the guide bush 18f prevents the circumferential end portions of the bush elements 38b, 38c coupled by the joint portion 40 from being displaced relative to each other in the axial direction and the circumferential direction of the cylindrical fitting portion 25a before it is attached to the fit-and-hold portion 36b provided on the axially outer end portion of the first housing portion 11b of the housing 9b. Thereby, the bush elements 38b, 38c are prevented from being separated from each other, thereby maintaining the configuration of the guide bush 18f substantially cylindrical.

The guide bush 18f (part except the elastic rings 26a, 26a) as described above is formed so as to be integral as a whole by performing injection molding of a synthetic resin. That is, the guide bush 18f having the end faces of the bush elements 38b, 38c with respect to the circumferential direction coupled to each other by the joint portion 40 is formed by injection molding using a molding die on which a runner portion where dissolved synthetic resin flows is provided, between the portions of the inner surface of the cavity that are to become the bush elements 38b, 38c.

When attaching the guide bush 18f described above to the fit-and-hold portion 36b, the guide bush 18f is inserted into this fit-and-hold portion 36b as it is (includes a state in which the width of the discontinuous portion 39b is decreased by the elasticity of the elastic rings 26a, 26a and the diameter is slightly reduced), and the axially inner end face of the cylindrical fitting portion 25a is caused to butt against the inner end face (stepped face) of the fit-and-hold portion 36b. The rack shaft 7 is inserted into this cylindrical fitting portion 25a, and the bush elements 38b, 38c are displaced in a direction where they separate from each other, against the tensile stress of the joint portion 40 and the elasticity of the elastic rings 26a, 26a. Thereby, the joint portion 40 is broken and the widths of the discontinuous portions 39a, 39b with respect to the circumferential direction are increased (L0 is changed to L1), whereby the outside diameter of the guide bush 18f is increased to separate the bush elements 38b, 38c from each other. The outer peripheral surface of the cylindrical fitting portion 25a is caused to abut or be closely opposed to the inner peripheral surface of the fit-and-hold portion 36b. That is, as in the case of the above-described guide bush of Patent Document 3, if members the outside diameter (wire diameter) of the cross-sectional shape of which is greater than the depth of the catching grooves 31a, 31a in free state are used as the elastic rings 26a, 26a, the outer peripheral surface of the cylindrical fitting portion 25a and the inner peripheral surface of the fit-and-hold portion 36b are closely opposed to each other through an annular gap. In this state, the elastic rings 26a, 26a are elastically compressed (held) between the bottom surfaces of the catching grooves 31a, 31a and the inner peripheral surface of the fit-and-hold portions 36b. On the contrary, when members the thickness of the cross-sectional shape with respect to the radial direction of the rack shaft 7 of which is not more than the depth of the catching grooves 31a, 31a in free state are used as the elastic rings 26a, 26a, the outer peripheral surface of the cylindrical fitting portion 25a and the inner peripheral surface of the fit-and-hold portion 36b abut each other. In this case, not only members that are circular in cross section in free state as shown in the figure but also members that are, for example, rectangular or oval may be used as the elastic rings 26a, 26a. In any case, in a state in which the outside diameter of the guide bush 18f is increased, the flange portion 27a is engaged with the engagement groove 34a provided along the entire circumference on a part near the side of the outer end in the axial direction of the fit-and-hold portion 36b (the outer peripheral surface of the flange portion 27a and the bottom surface of the engagement groove 34a abut each other or are closely opposed to each other).

By increasing the widths of the discontinuous portions 39a, 39b with respect to the circumferential direction, the inside of the housing 9b is made to communicate with the outside air, thereby enabling the adjustment of the pressure inside this housing 9b (providing ventilation). To achieve such a structure, according to the present example, each portion of the guide bush 18f is configured as follows. That is, before inserting the rack shaft 7 into the cylindrical fitting portion 25a (free state, in a state where the widths of the discontinuous portions 39a, 39b with respect to the circumferential direction are L0), the outside diameter (the diameter of the circumscribed circle) D0 of the flange portion 27a is not greater than the inside diameter d of the fit-and-hold portion 36b (D0≤d). On the other hand, in a state in which the rack shaft 7 is inserted in the cylindrical fitting portion 25a, it is configured such that the outside diameter of this cylindrical fitting portion 25a and the outside diameter of the flange portion 27a are substantially the same as the inside diameter of the fit-and-hold portion 36b and the inside diameter of the bottom surface of the engagement groove 34a, respectively. Specifically, the configuration of the guide bush 18f is restricted so that, when the number of bush elements 38b, 38c is n (two in the case of the present example), the outside diameter of the flange portion 27a in a state in which the rack shaft 7 is inserted on the inside diameter side of the cylindrical fitting portion 25a is D and the width of the discontinuous portion 39a (39b) with respect to the circumferential direction is L1, this width L1 is equal to or greater than $(D-d)\sin(\pi/n)$, that is, so that $L1 \geq (D-d)\sin(\pi/n)$.

According to the guide bush 18f of the present example described above, attachment to the fit-and-hold portion 36b can be performed easily. That is, in the guide bush 18f of the present example, the circumferential end portions of the pair of semicylindrical bush elements 38b, 38c are coupled together by the joint portion 40 before inserting the rack shaft 7 thereinside, and the circumferential end portions coupled by the joint portion 40 can be prevented from being displaced relative to each other in the axial direction and the circumferential direction of the cylindrical fitting portion 25a. Thereby, the bush elements 38b, 38c can be prevented from separating from each other, so that the configuration of the guide bush 18f can be maintained substantially cylindrical. The dimensions of parts of this guide bush 18f are restricted so that the outside diameter D0 of the flange portion 27a is not greater than the inside diameter d of the fit-and-hold portion 36b in the state before the rack shaft 7 is inserted into the cylindrical fitting portion 25a. For this reason, when attaching the guide bush 18f to the fit-and-hold portion 36b, the guide bush 18f can be inserted into this fit-and-hold portion 36b as it is. That is, a jig for pushing this guide bush 18g into this fit-and-hold portion 36b with a great deal of force and inserting it while reducing the outside diameter is unnecessary, so that this assembling work is facilitated (the working efficiency is improved). By inserting the rack shaft 7 into the cylindrical fitting portion 25a, the joint portion 40 is broken and the elastic rings 26a, 26a are elastically deformed, whereby the widths of the discontinuous portions 39a, 39b with respect to the circumferential direction are increased to increase the outside diameter of the guide bush 18f. Thereby, the bush elements 38b, 38c are separated. The outer peripheral surface of the cylindrical fitting portion 25a and the inner peripheral surface of the fit-and-hold portion 36b are caused to abut each other or closely opposed to each other, and the flange portion 27a and the engagement groove 34a are engaged with each other. Consequently, the guide bush 18f and thus the rack shaft 7 can be supported in the fit-and-hold portion 36b through the guide bush 18b without play, and the axial displacement of the rack shaft 7 can be smoothly performed with the operation of the steering wheel 1 (see FIG. 16).

Further, in the case of the present example, by not only fitting the elastic rings 26a, 26a along the catching grooves 31a, 31a but also providing the joint portion 40, the separation of the bush elements 38b, 38c and the increase in the diameter of the guide bush 18f can be prevented in the state before the rack shaft 7 is inserted into the cylindrical fitting portion 25a. For this reason, even when the guide bush 18f includes a plurality of bush elements 38b, 38c, handling and transportability can be ensured. That is, the bush elements 38b, 38c can be effectively prevented from separating from each other from the time the guide bush 18f is manufactured at a manufacturing factory and conveyed from the manufacturing factory to a rack-and-pinion steering apparatus assembling factory to the time it is attached to the fit-and-hold portion 36b. Particularly, in the case of the present example, since the guide bush 18f formed by coupling the bush elements 38b, 38c together by the joint portion 40 is integrally formed by injection molding of a synthetic resin, increase in management cost due to increase in the number of parts and complication of the assembling work can be prevented. Since the bush elements 38b, 38c are coupled together by the joint portion 40, the work to fit the elastic rings 26a, 26a along the catching grooves 31a, 31a can be performed in a state in which the bush elements 38b, 38c are prevented from separating from each other or shifting in the radial direction. Consequently, the work to fit the elastic rings 26a and 26b along the catching grooves 31a, 31a can be performed easily.

When the outside diameter of the elastic rings 26a and 26b in free state is greater than the depth of the catching grooves 31a, 31a, the pair of elastic rings 26a and 26b are elastically held between the bottom surfaces of the catching grooves 31a, 31a and the inner peripheral surface of the fit-and-hold portion 36b. For this reason, even when the roundness of the inner peripheral surface of this fit-and-hold portion 36b is not excellent, the axial displacement of the rack shaft 7 can be performed smoothly. This reason is similar to the case of the above-described structure of Patent Document 3. On the other hand, when the outside diameter of the elastic rings 26a, 26a in free state is not more than the depth of the catching grooves 31a, 31a, the outer peripheral surface of the cylindrical fitting portion 25a and the inner peripheral surface of the fit-and-hold portion 36b can be caused to abut each other in a wide range except the part where the catching grooves 31a, 31a are provided and the part where the gaps 39a, 39b are provided. As a result, the area of the part bearing the radial load applied from the rack shaft 7 can be increased.

Figure 21:
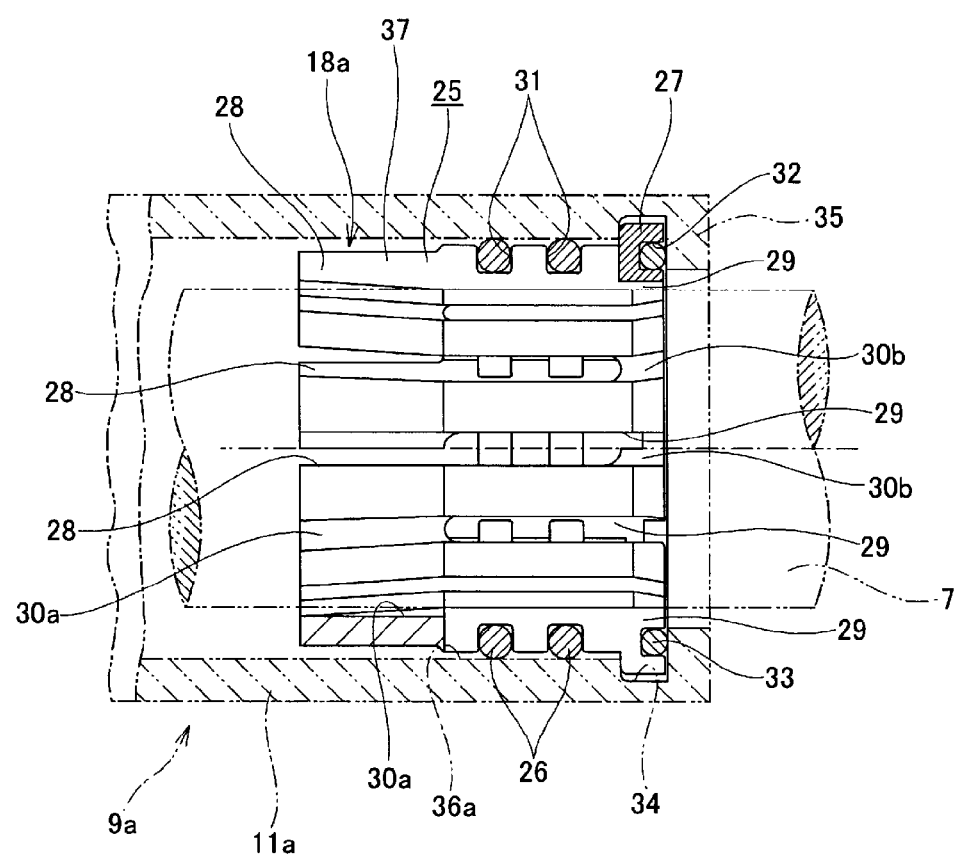
FIG. 21 is an enlarged cross-sectional view of the structure according to the second conventional example.
Figure 22:
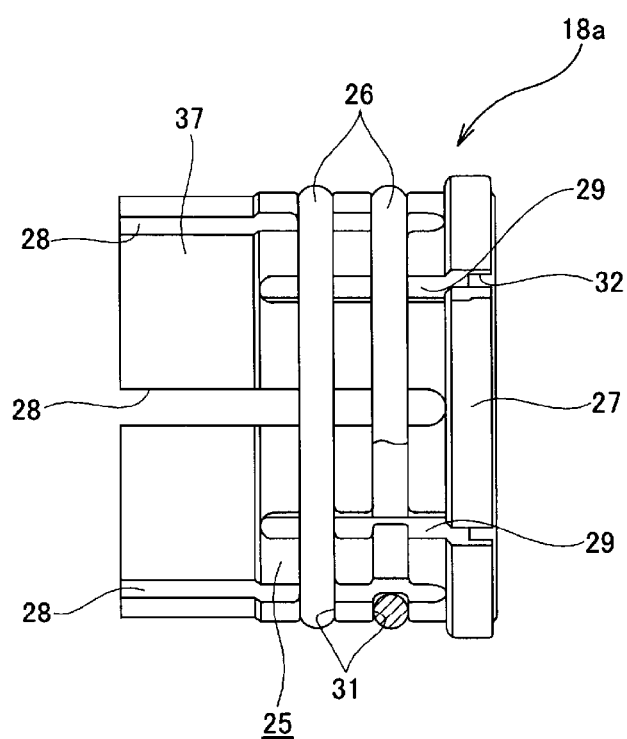
FIG. 22 is a side view of the guide bush of FIG. 21.

In the case of the present example, by structuring the guide bush 18f by combining the pair of bush elements 38b, 38c, the outside diameter of this guide bush 18f can be increased and the pressure inside the housing 9b can be adjusted (ventilation can be secured). Therefore, it is unnecessary to provide, on the cylindrical fitting portion 25a, the small diameter portion 37, a plurality of slits 28, 29 (see FIG. 21 and FIG. 22) and further, the ventilating grooves 30a, 30b (see FIG. 21 and FIG. 22) that are open at the small diameter portion 37 and the slits 28, 29 for making it possible to increase or decrease the outside diameter of the guide bush 18 and securing ventilation like the structure of Patent Document 3. For this reason, unnecessary increase in the manufacturing cost of the guide bush 18f can be curbed. In the case of the present example, since the ventilating grooves 30a, 30b are not provided, the entire inner peripheral surfaces of the bush elements 38b, 38c of the guide bush 18f can be caused to abut the outer peripheral surface of the rack shaft 7. Consequently, even if the length in the axial direction of the guide bush 18f is short, the area of sliding contact between the inner peripheral surface of the cylindrical fitting portion 25a and the outer peripheral surface of the rack shaft 7 can be prevented from being excessively small, so that this guide bush 18f can be reduced in size while the abrasion resistance of the guide bush 18f is sufficiently ensured.

Figure 11A:
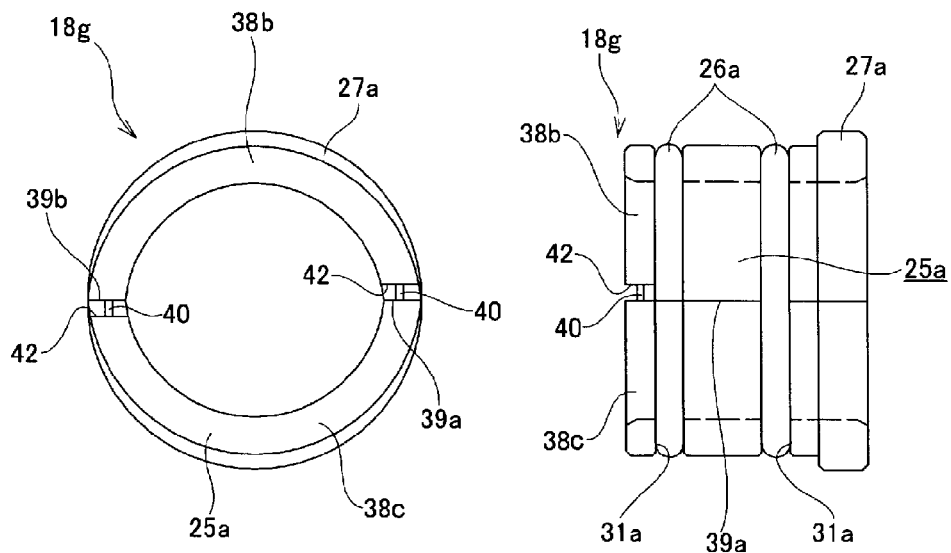
FIG. 11A includes an end view of a guide bush according to a first modification of the second embodiment and a side view of the guide bush viewed from the right side of the end view, and showing a state before inserting a rack shaft into the guide bush.
Figure 11B:
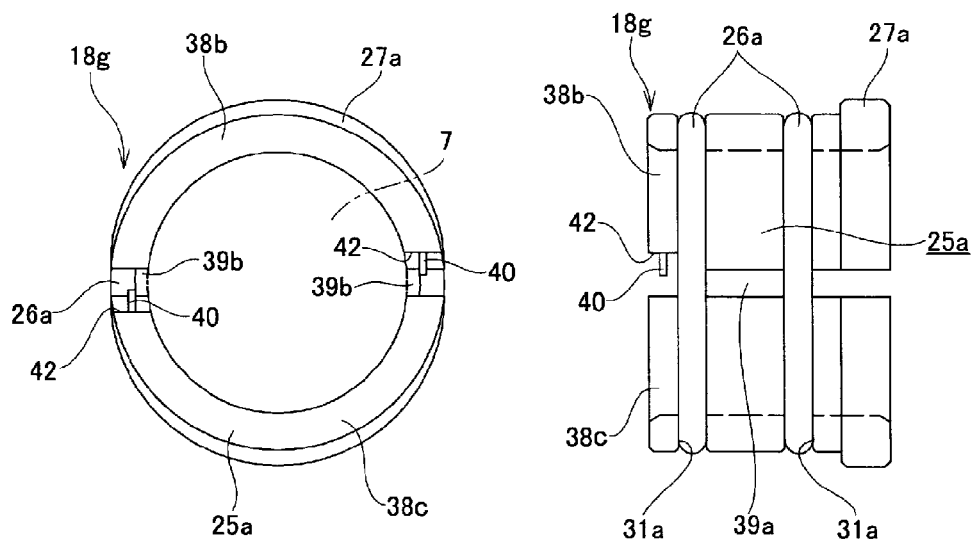
FIG. 11B includes an end view of the guide bush of FIG. 11A and a side view of the guide bush viewed from the right side of the end view, illustrating a state after inserting the rack shaft into the guide bush.

FIG. 11A and FIG. 11B illustrate a first modification of the second embodiment of the present invention. On a guide bush 18g of the present example, the joint portions 40, 40 for preventing the pair of bush elements 38b, 38c from separating from each other before attaching the guide bush 18g to the fit-and-hold portion 36b (see FIG. 8 and FIG. 10) and the rack shaft 7 is inserted therein are provided in two positions opposite to each other in the circumferential direction. That is, the joint portions 40, 40 are provided at the discontinuous portions 39a, 39b provided in two locations in the circumferential direction, respectively. According to the present example having this structure, the effect of maintaining the configuration of the guide bush 18g substantially cylindrical can be obtained more greatly. Since the configurations and operations of other portions are similar to those of the above-described second embodiment, the illustrations and descriptions related to the overlapping portions will be omitted.

Figure 12A:
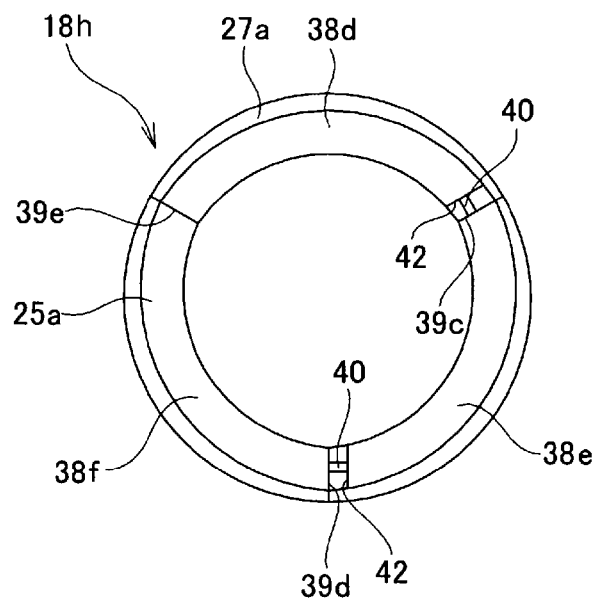
FIG. 12A is an end view of a guide bush according to a second modification of the second embodiment, and showing a state before inserting a rack shaft into the guide bush.
Figure 12B:
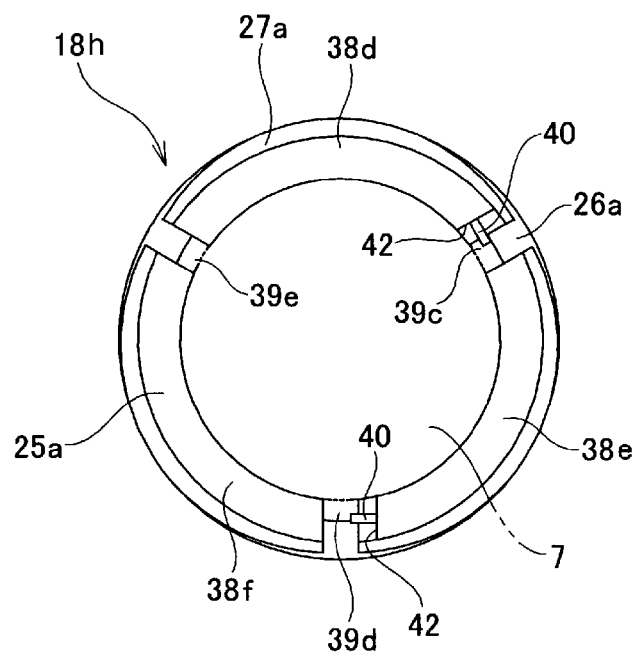
FIG. 12B is an end view of the guide bush of FIG. 12A, illustrating a state after inserting the rack shaft into the guide bush.

FIG. 12A and FIG. 12B illustrate a second modification of the second embodiment. In the case of the present example, a guide bush 18h is configured so as to be substantially cylindrical as a whole by combining three bush elements 38d to 38f that are each partially cylindrical (⅓ substantially cylindrical). The joint portions 40, 40 for preventing the bush elements 38d to 38f from separating from each other are provided between the end faces of the bush elements 38d to 38f with respect to the circumferential direction interposing, among the discontinuous portions 39c to 39e at three locations in the circumferential direction, the discontinuous portions 39c, 39d at two locations. According to the present example having this structure, since the number of discontinuous portions 39a to 39c is three, the adjustment of the pressure inside the housing 9b (see FIG. 8) can be performed more effectively. Since the configurations and operations of other portions are similar to those of the above-described second embodiment, the illustrations and descriptions related to the overlapping portions will be omitted.

Figure 13A:
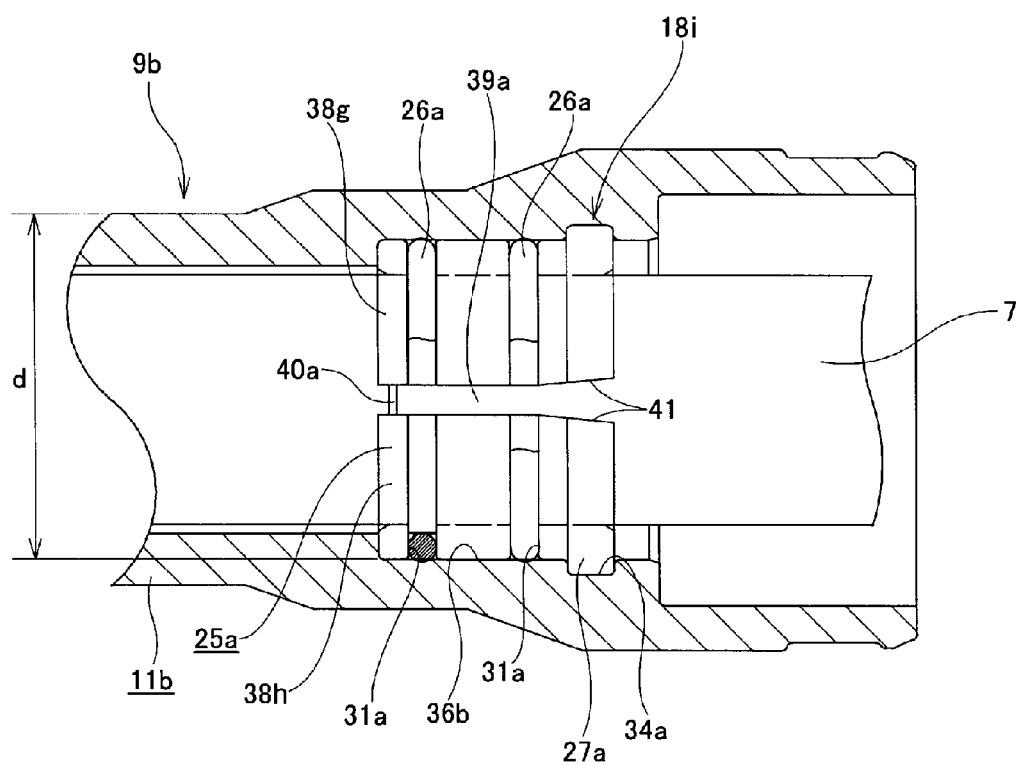
FIG. 13A is an enlarged cross-sectional view of a structure according to a third modification of the second embodiment.
Figure 13B:
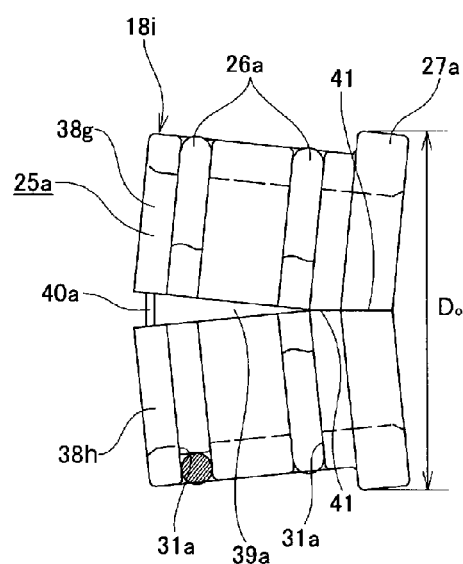
FIG. 13B is a side view of the guide bush of FIG. 13A, illustrating a state before the rack shaft is inserted into the guide bush.

FIG. 13A and FIG. 13B illustrate a third modification of the second embodiment. On a guide bush 18i of the present example, a pair of slanted face portions 41, 41 slanting in directions separating from each other toward the axially outer side are provided on the end faces of a pair of bush elements 38g, 38h opposed to each other in the circumferential direction at the axially outer end portions of the cylindrical fitting portion 25a. A joint portion 40a is provided to bridge between the end faces of the bush elements 38g, 38h with respect to the circumferential direction at the axially inner end portion of the cylindrical fitting portion 25a.

According to the present example, the slanted face portions 41, 41 are caused to abut each other or closely opposed to each other in a state before the rack shaft 7 is inserted in the cylindrical fitting portion 25a (in free state in the present example). Thereby, the outside diameter D0 of the flange portion 27a is made not greater than the inside diameter d of the fit-and-hold portion 36b (D0≤d). In the case of the present example, with the insertion of the rack shaft 7 into the cylindrical fitting portion 25a, the joint portion 40a is extended (plastically deformed or elastically deformed) in the circumferential direction and the bush elements 38g, 38h are displaced by swinging, thereby increasing the width between the slanted face portions 41, 41. Thereby, the outside diameter of the guide bush 18i (the outside diameter of the flange portion 27a) is increased. In the case of the present example having this structure, since it is unnecessary to separate the bush elements 38g, 38h even in a state after the assembly, the working efficiency of replacement of the guide bush 18i or the like can also be improved. Since the configurations and operations of other portions are similar to those of the above-described second embodiment, the illustrations and descriptions related to the overlapping portions will be omitted.

Figure 14A:
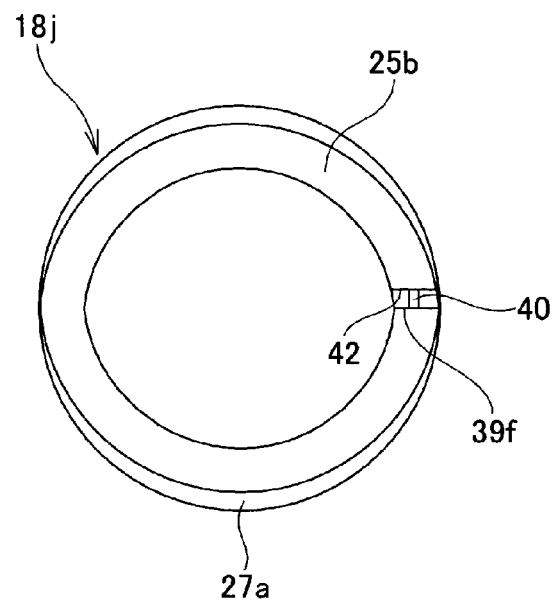
FIG. 14A is an end view of a guide bush according to a fourth modification of the second embodiment, illustrating a state before the rack shaft is inserted into the guide bush.
Figure 14B:
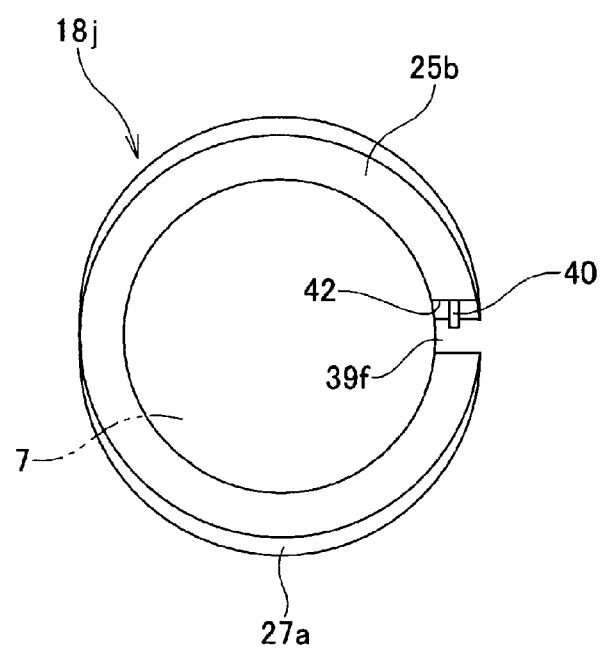
FIG. 14B is an end view of the guide bush of FIG. 14A, illustrating a state after inserting the rack shaft into the guide bush.

FIG. 14A and FIG. 14B illustrate a fourth modification of the second embodiment. On a guide bush 18j of the present example, a discontinuous portion 3f is provided at one location in the circumferential direction of a cylindrical fitting portion 25b. The cylindrical fitting portion 25b includes the joint portion 40 provided to bridge between the end faces with respect to the circumferential direction at locations interposing the discontinuous portion 39f. According to the present example, by providing the joint portion 40, the outside diameter D0 of the guide bush 18j (flange portion 27a) is made not greater than the inside diameter d of the fit-and-hold portion 36b (see FIG. 8) in a state before the rack shaft 7 is inserted into the cylindrical fitting portion 25b, thereby facilitating the attachment (insertion) of the guide bush 18j to this fit-and-hold portion 36b. Since the configurations and operations of other portions are similar to those of the second embodiment described above, the illustrations and descriptions related to the overlapping portions will be omitted.

Figure 15:
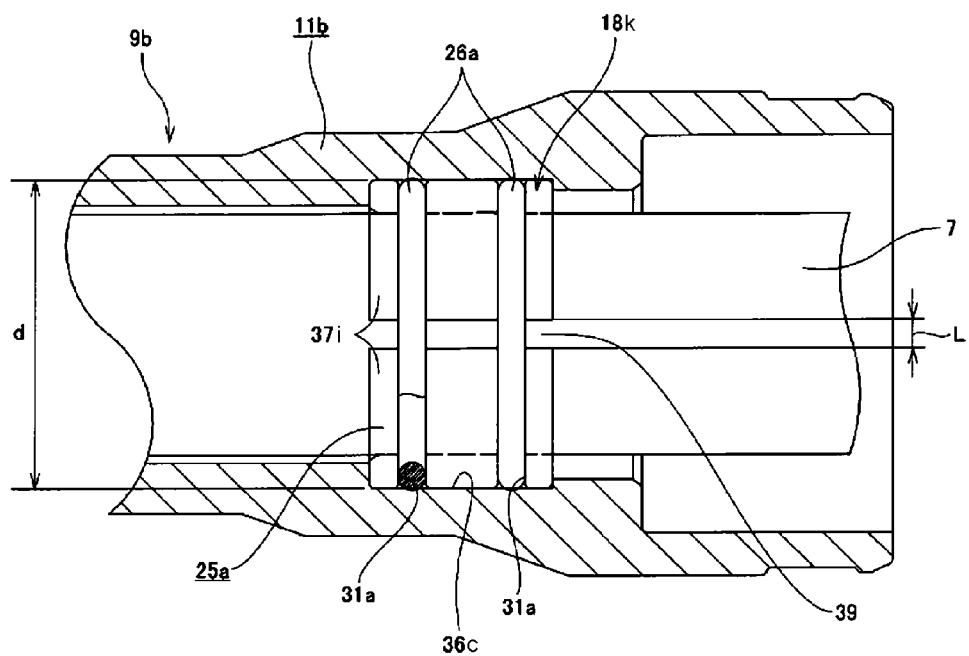
FIG. 15 is an enlarged cross-sectional view of a structure according to another modification of the first embodiment and the second embodiment.
Figure 16:
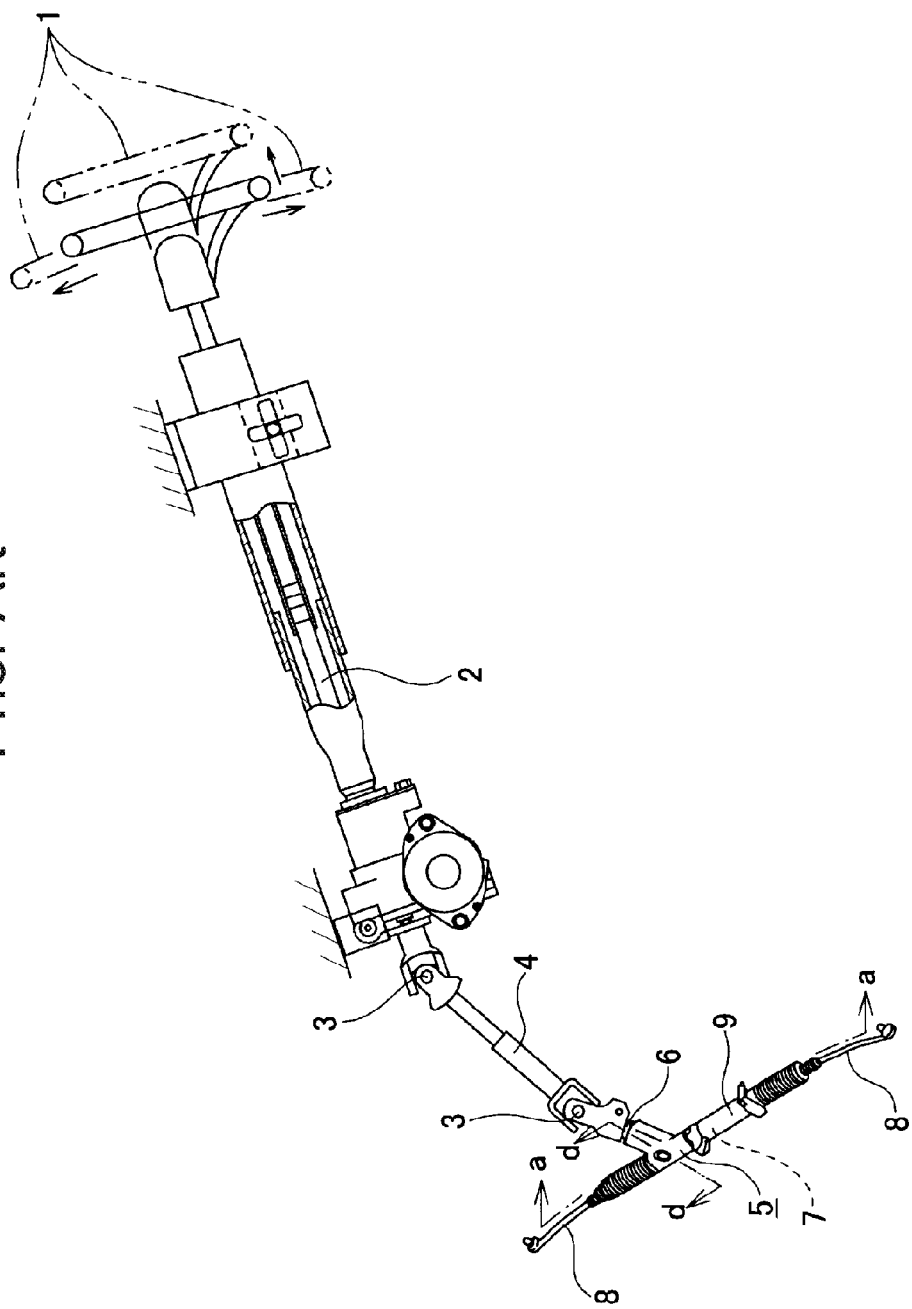
FIG. 16 is a partially cutaway side view of the steering apparatus according to the first conventional example.
Figure 17:
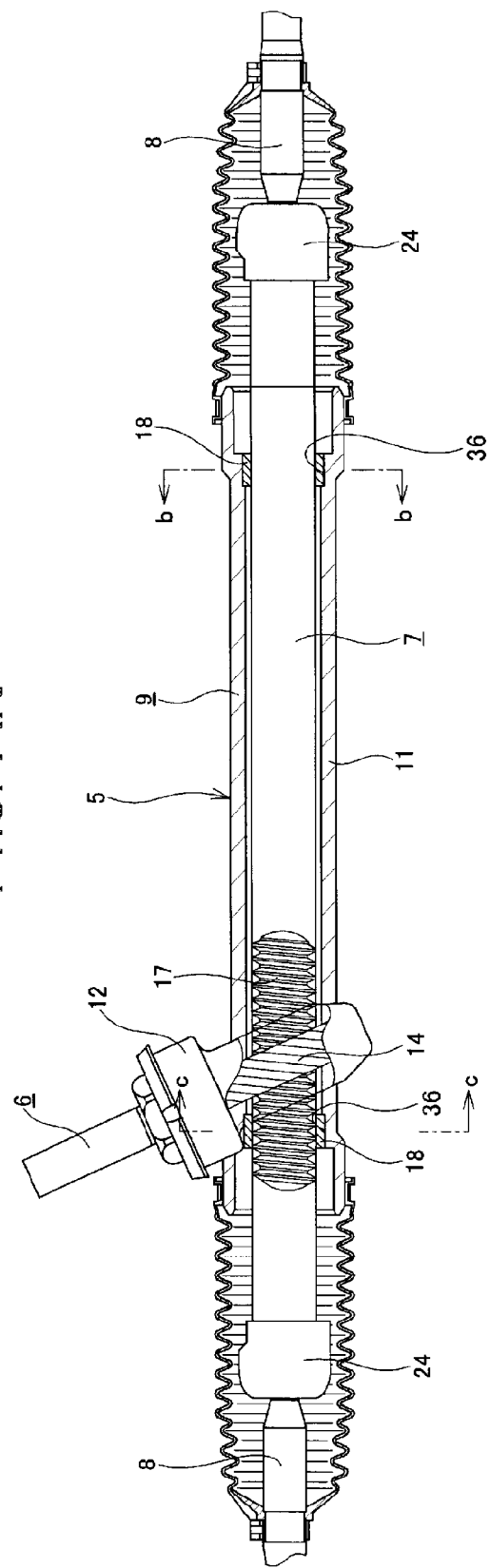
FIG. 17 is an a-a cross-sectional view of FIG. 16.
Figure 18:
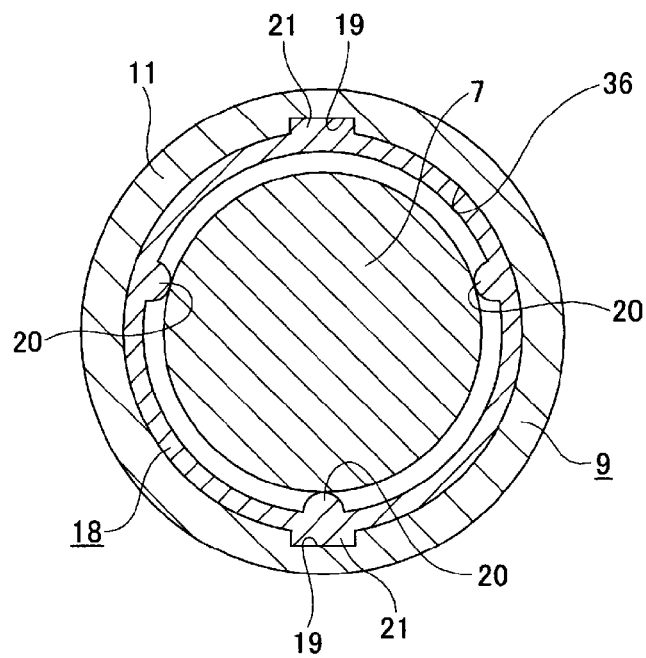
FIG. 18 is a b-b cross-sectional view of FIG. 17.
Figure 19:
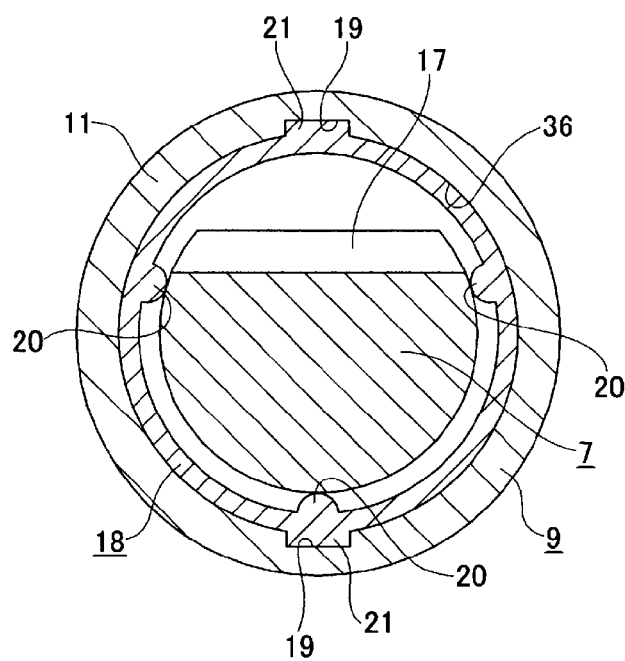
FIG. 19 is a c-c cross-sectional view of FIG. 17.
Figure 20:
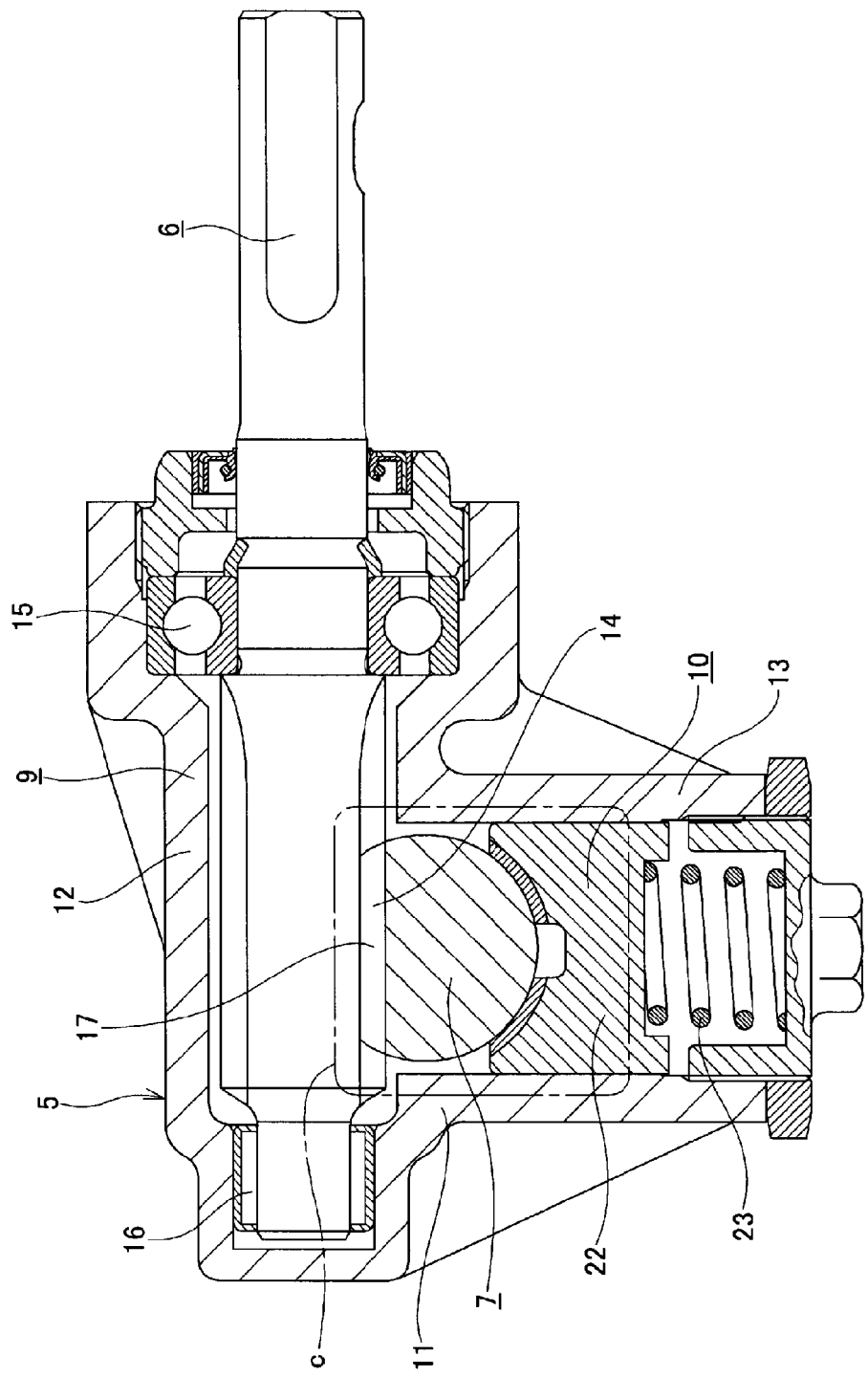
FIG. 20 is a d-d cross-sectional view of FIG. 16.

FIG. 15 illustrates another example of the first embodiment. In the case of the present modification, a guide bush 18k does not have the flange portion 27a. A fit-and-hold portion 36c of the housing 9b does not have the engagement groove 34a where the flange portion 27a is locked. Instead, the fit-and-hold portion 36b itself is formed as a groove. The length in the axial direction of this groove is slightly larger than the overall length of the guide bush 18k. The diameter of the circumscribed circle of a plurality of bush elements 37i forming the guide bush 18k in a state in which the end faces of the plurality of bush elements 37i with respect to the circumferential direction abut each other is not greater than the inside diameter of the fit-and-hold portion 36c. The attachment of the guide bush 18k to the fit-and-hold portion 36c is performed, as in the above-described embodiment, by decreasing the diameter of the guide bush 18k and then, inserting the rack shaft 7 thereinto to increase the outside diameter of the guide bush 18k. The movement of the guide bush 18k in the axial direction is restricted by the stepped portions at both end portions in the axial direction of the fit-and-hold portion 36c. The inside diameter of the protruding portions forming the stepped portions on the outside in the axial direction of the fit-and-hold portion 36c is smaller than the inside diameter of the fit-and-hold portion 36c but equal to or greater than the diameter of the circumscribed circle of the plurality of bush elements 37i in a state in which the end faces of the plurality of bush elements 37i with respect to the circumferential direction abut each other. Although the joint portion 40 of the second embodiment is not shown in FIG. 15, the present example having neither the flange portion 27a nor the engagement groove 34a may be applied as another modification of the second embodiment.

INDUSTRIAL APPLICABILITY

According to the first embodiment, the second embodiment and their modifications described above, a pair of elastic rings are fitted along a pair of catching grooves on the outer peripheral surface of the cylindrical fitting portion, respectively. However, the number of elastic rings fitted along the outer peripheral surface of this cylindrical fitting portion may be three or more. When it is intended only to prevent inadvertent increase in the outside diameter of the guide bush and separation of a plurality of bush elements before attaching the guide bush to the fit-and-hold portion provided in the housing or before inserting the displacement shaft into the cylindrical fitting portion (a structure where the rack shaft can be smoothly displaced in the axial direction is not adopted also when the roundness of this fit-and-hold portion is not excellent), the number of elastic rings fitted along the cylindrical fitting portion may be only one. Alternatively, if the bush elements are prevented from separating from each other, a member other than the elastic ring may be adopted or this elastic ring may be omitted.

In the second embodiment and its modifications described above, the location in the axial direction where the flange portion is engaged with the engagement groove of the fit-and-hold portion is not limited to the structures of the examples of the embodiments. That is, it is not limited to the axially outer end portion but the flange portion may be provided at an axially intermediate portion or an axially inner end portion. Regarding the joint portion, not only the configuration may be changed as appropriate but it may be provided at an axially intermediate portion or an axially outer end portion or provided at a plurality of locations in the axial direction. That is, the cylindrical fitting portion may be configured such that a convex portion (locking pin) is provided at one of the end faces with respect to the circumferential direction at locations interposing the discontinuous portion, and this convex portion is pushed into a concave portion (holding hole) provided at the other end face. However, in the case of the structure where a pair of slanted face portions are provided on the end faces of the bush elements opposed to each other in the circumferential direction as in the third modification of the second embodiment described above, the joint portion is provided to bridge between the end faces of the blush elements with respect to the circumferential direction at an axial end portion of the cylindrical fitting portion, the flange portion is provided on the outer peripheral surface at the other axial end portion, and the slanted face portions are provided on the end faces of the bush elements with respect to the circumferential direction. In order to prevent a plurality of bush elements forming the guide bush from separating from each other before attaching to the fit-and-hold portion, the joint portion is provided at at least "n-1" locations interposing discontinuous portions where there are "n" bush elements and "n" discontinuous portions along the circumferential direction.

When attaching the guide bush described above to the foregoing rack-and-pinion steering apparatus as shown in FIGS. 16 to 19, a structure may be adopted where the guide bush is provided on, of both end portions in the axial direction of the first housing portion of the housing, only at the end portion (the right end portion of FIG. 17) on the side far from the portion of meshing between the rack teeth provided on the rack shaft and the pinion teeth provided on the pinion shaft with respect to the axial direction of this rack shaft.

The present application is based on Japanese Patent Application No. 2013-118624 filed on Jun. 5, 2013, Japanese Patent Application No. 2013-141567 filed on Jul. 5, 2013 and Japanese Patent Application No. 2014-088500 filed on Apr. 22, 2014, the contents of which are incorporated herein by reference.

DESCRIPTION OF REFERENCE SIGNS

1 Steering Wheel
2 Steering Shaft
3 Universal Joint
4 Intermediate Shaft
5 Steering gear Unit
6 Pinion Shaft
7 Rack Shaft
8 Tie Rod
9, 9a, 9b Housing
10 Pressing Means
11, 11a, 11b First Housing Portion
12 Second Housing Portion
13 Third Housing Portion
14 Pinion Teeth
15 Rolling Bearing
16 Rolling Bearing
17 Rack teeth
18, 18a to 18k Guide Bush
19 Engagement Recess
20 Guiding Protrusion
21 Engagement Protrusion
22 Pressing Member
23 Spring
24 Ball Joint
25, 25a Cylindrical Fitting Portion
26, 26a Elastic Ring
27, 27a to 27c Flange Portion
28, 29 Slits
30a, 30b Ventilating Groove
31, 31a Catching Groove
32 Catching Groove
33 Elastic Ring
34 Engagement Groove
35 Inward Flange Portion
36 Fit-and-Hold Portion
37 Small Diameter Portion
38, 38a to 38i Bush Element
39 Gap
39a to 39e Discontinuous Portion
40, 40a Joint Portion
41 Slanted Face Portion
42 Notch Portion

The invention claimed is:

1. A guide bush comprising a plurality of bush elements combined to form a cylindrical shape as a whole,
wherein the plurality of bush elements comprises a cylindrical fitting portion configured to be fitted in a fit-and-hold portion of a housing having a cylindrical inner peripheral surface, the cylindrical fitting portion having an inner peripheral surface configured to guide an outer peripheral surface of a displacement shaft that has been inserted in the cylindrical fitting portion in an axially displaceable manner,
wherein a diameter of a circumscribed circle of the plurality of bush elements in a state in which end faces of the plurality of bush elements with respect to a circumferential direction abut each other is not greater than an inside diameter of the fit-and-hold portion, and
wherein a gap is provided between the end faces of the plurality of bush elements with respect to the circumferential direction in a state in which the cylindrical fitting portion is fitted in the fit-and-hold portion and the displacement shaft is inserted in the cylindrical fitting portion.

2. The guide bush according to claim 1, wherein the plurality of bush elements further comprises a flange portion provided to protrude radially outward from an axially partial outer peripheral surface of the cylindrical fitting portion and configured to engage with an engagement groove formed on the inner peripheral surface of the fit-and-hold portion, and
wherein a diameter of a circumscribed circle of the flange portion in the state in which the end faces of the plurality of bush elements with respect to the circumferential direction about each other is not greater than the inside diameter of the fit-and-hold portion.

3. The guide bush according to claim 2, wherein a width L of the gap with respect to the circumferential direction is equal to or greater than $(D-d)\sin(\pi/n)$, wherein n is the number of the plurality of bush elements, D is the diameter of the circumscribed circle of the flange portion in a state in which the displacement shaft is inserted in the cylindrical fitting portion, and d is the inside diameter of the fit-and-hold portion.

4. The guide bush according to claim 2, further comprising a joint portion configured to couple the plurality of bush elements to each other in a state before the displacement shaft is inserted into the cylindrical fitting portion and to break or to elongate in the circumferential direction in accordance with the insertion of the displacement shaft into the cylindrical fitting portion,
wherein the joint portion is provided to bridge between the end faces of the plurality of bush elements with respect to the circumferential direction, and couples, at least axially partially, the end faces with respect to the circumferential direction to each other.

5. The guide bush according to claim 4, wherein the joint portion is provided at one axial end portion of the cylindrical fitting portion,
the flange portion is provided at another axial end portion of the cylindrical fitting portion,
the end faces of the plurality of bush elements with respect to the circumferential direction comprise a pair of slanted face portions opposed to each other in the circumferential direction at the other axial end portion of the cylindrical fitting portion and slanting in directions separating from each other toward an axially outer side of the cylindrical fitting portion, and
the diameter of the circumscribed circle of the flange portion is not greater than the inside diameter of the fit-and-hold portion in the state before the displacement shaft is inserted into the cylindrical fitting portion and in a state in which the pair of slanted face portions are caused to abut each other or closely opposed to each other.

6. The guide bush according to claim 2, wherein the diameter of the circumscribed circle of the flange portion is not greater than the inside diameter of the fit-and-hold portion in a state before the displacement shaft is inserted into the cylindrical fitting portion.

7. The guide bush according to claim 1, further comprising an elastic ring,
wherein an outer peripheral surface of the cylindrical fitting portion has a catching groove, and
the elastic ring is fitted along the catching groove.

8. A guide bush comprising:
a cylindrical fitting portion configured to be fitted in a fit-and-hold portion of a housing having a cylindrical inner peripheral surface, the cylindrical fitting portion comprising an inner peripheral surface configured to guide an outer peripheral surface of a displacement shaft that has been inserted in the cylindrical fitting portion in an axially displaceable manner and a discontinuous portion at at least one location in a circumferential direction; and
a joint portion provided to bridge between end faces of the cylindrical fitting portion with respect to a circumferential direction interposing the discontinuous portion and couples, at least axially partially, the end faces with respect to the circumferential direction to each other,
wherein the joint portion is configured to break or to elongate in the circumferential direction in accordance with the insertion of the displacement shaft into the cylindrical fitting portion, and
a width of the discontinuous portion with respect to the circumferential direction is increased by the insertion of the displacement shaft into the cylindrical fitting portion.

9. The guide bush according to claim 8, further comprising a flange portion provided to protrude radially outward from an axially partial outer peripheral surface of the cylindrical fitting portion and configured to engage with an engagement groove formed on the inner peripheral surface of the fit-and-hold portion.

10. The guide bush according to claim 9, wherein a diameter of a circumscribed circle of the flange portion is not greater than the inside diameter of the fit-and-hold portion in a state before the displacement shaft is inserted into the cylindrical fitting portion.

11. The guide bush according to claim 9, wherein the discontinuous portion is provided at a plurality of locations in the circumferential direction, and
the guide bush is formed by coupling a plurality of partially cylindrical bush elements together by the joint portion in a state before the displacement shaft is inserted into the cylindrical fitting portion.

12. The guide bush according to claim 11, wherein the joint portion is provided to bridge between the end faces of the plurality of bushes with respect to the circumferential direction at an axial end portion of the cylindrical fitting portion,
the flange portion is provided at another axial end portion of the cylindrical fitting portion,
the end faces of the plurality of bush elements with respect to the circumferential direction comprise a pair of slanted face portions opposed to each other in the circumferential direction at the other axial end portion of the cylindrical fitting portion and slanting in directions separating from each other toward an axially outer side of the cylindrical fitting portion, and
a diameter of a circumscribed circle of the flange portion is not greater than the inside diameter of the fit-and-hold portion in the state before the displacement shaft is inserted into the cylindrical fitting portion and in a state in which the pair of slanted face portions are caused to abut each other or closely opposed to each other.

13. The guide bush according to claim 8, wherein the discontinuous portion is provided only at one location in the circumferential direction.

14. A rack-and-pinion steering gear unit comprising:
a housing having a fit-and-hold portion and configured to be fixed to a vehicle body;
a guide bush fixed to the fit-and-hold portion, the guide bush comprising a plurality of bush elements combined to form a cylindrical shape as a whole, wherein the plurality of bush elements comprises a cylindrical fitting portion configured to be fitted in the fit-and-hold portion of the housing having a cylindrical inner peripheral surface, the cylindrical fitting portion having an inner peripheral surface configured to guide an outer peripheral surface of a displacement shaft that has been inserted in the cylindrical fitting portion in an axially displaceable manner, wherein a diameter of a circumscribed circle of the plurality of bush elements in a state in which end faces of the plurality of bush elements with respect to a circumferential direction abut each other is not greater than an inside diameter of the fit-and-hold portion, and wherein a gap is provided between the end faces of the plurality of bush elements with respect to the circumferential direction in a state in which the cylindrical fitting portion is fitted in the fit-and-hold portion and the displacement shaft is inserted in the cylindrical fitting portion;
a rack shaft having a front face on which rack teeth are formed axially partially, and supported inside the housing in a state of being inserted in the guide bush;
a pinion shaft having an outer peripheral surface on which pinion teeth are formed axially partially, and rotatably supported inside the housing in a state in which the pinion teeth are meshed with the rack teeth; and
pressing means comprising a pressing member and provided inside the housing in a state in which the pressing member elastically presses a portion of a back face of the rack shaft opposite to the pinion shaft across the rack shaft,
wherein with respect to an axial direction of the rack shaft, the fit-and-hold portion is provided at at least one end portion of the housing, the one end portion being farther from the pinion shaft than another end portion of the housing, and
an outer peripheral surface of the rack shaft is supported inside the housing in a state of being guided by the inner peripheral surface of the guide bush in the axially displaceable manner.

* * * * *